(12) United States Patent
Weng et al.

(10) Patent No.: US 12,517,203 B2
(45) Date of Patent: Jan. 6, 2026

(54) CHEMICAL-SHIFT-SELECTIVE PHASE-COMPENSATED ADIABATIC 2-REFOCUSING PULSE PAIR AND SPECTRAL EDITING METHODS FOR ULTRA-HIGH-FIELD MAGNETIC RESONANCE SPECTROSCOPY

(71) Applicant: Universität Bern, Bern (CH)

(72) Inventors: Guodong Weng, Bern (CH); Johannes Slotboom, Kaufdorf (CH)

(73) Assignee: UNIVERSITÄT BERN, Bern (CH)

( * ) Notice: Subject to any disclaimer, the term of this patent is extended or adjusted under 35 U.S.C. 154(b) by 102 days.

(21) Appl. No.: 18/288,360

(22) PCT Filed: Mar. 22, 2022

(86) PCT No.: PCT/IB2022/052620
§ 371 (c)(1),
(2) Date: Oct. 25, 2023

(87) PCT Pub. No.: WO2022/229728
PCT Pub. Date: Nov. 3, 2022

(65) Prior Publication Data
US 2024/0241199 A1    Jul. 18, 2024

(30) Foreign Application Priority Data

Apr. 30, 2021  (EP) .................................. 21171729

(51) Int. Cl.
*G01V 3/00* (2006.01)
*G01R 33/46* (2006.01)
(Continued)

(52) U.S. Cl.
CPC ....... *G01R 33/485* (2013.01); *G01R 33/4616* (2013.01); *G01R 33/4822* (2013.01); *G01R 33/56527* (2013.01)

(58) Field of Classification Search
CPC .............. G01R 33/287; G01R 33/4835; G01R 33/5608; A61B 2090/374
(Continued)

(56) References Cited

U.S. PATENT DOCUMENTS 6,127,824 A * 10/2000 Sydney Smith ..... G01R 33/441
6,436,708 B1 * 8/2002 Leone .................... C12N 15/86
435/320.1

(Continued)

FOREIGN PATENT DOCUMENTS

CN  102920455 B  * 11/2015  ......... G01R 33/4828
CN  109791139 A  *  5/2019  ......... G01N 21/6428
(Continued)

OTHER PUBLICATIONS

International search report and written opinion of the International Searching Authority issued in connection with PCT/IB2022/052620.

(Continued)

*Primary Examiner* — Walter L Lindsay, Jr.
*Assistant Examiner* — Frederick Wenderoth
(74) *Attorney, Agent, or Firm* — Gallium Law; Jacob Panangat; Michael Bakke

(57) ABSTRACT

A method for generating 2π-refocusing pulses for magnetic resonance spectroscopy (MRS), and for performing spectral editing of MRS data using differential custom bandpass editing. Acquisition may be performed using echo-planar spectroscopic imaging (EPSI), for example. The 2π-refocusing is achieved using chemical-shift-selective adiabatic 2π-refocusing pulses, without spatial-selective (e.g. slice-selective) refocusing. The spectral editing method uses two data sets with different bandpass ('full' and 'partial') editing spectra, and takes the difference of the two edited spectra. The approach lends itself to 3D spectroscopy at $B_0$ of 7 T or (Continued)

higher, and permits whole brain J-coupled metabolite editing (e.g. 2HG or GABA), with greatly reduced specific absorption rate, shorter repetition time, minimal chemical-shift displacement artefacts (CDSAs), robustness to $B_0$-inhomogeneity and indifference to $B_1^+$-inhomogeneity compared with existing spatial-selective methods, such as MEGA.

20 Claims, 19 Drawing Sheets

(51) Int. Cl.
    *G01R 33/48*     (2006.01)
    *G01R 33/485*     (2006.01)
    *G01R 33/565*     (2006.01)

(58) Field of Classification Search
    USPC .......................................................... 324/309
    See application file for complete search history.

(56) References Cited

U.S. PATENT DOCUMENTS

| | | | | |
|---|---|---|---|---|
| 8,148,979 | B1 * | 4/2012 | Du | G01R 33/5602 |
| | | | | 324/307 |
| 10,132,903 | B2 * | 11/2018 | Wheaton | G01R 33/56536 |
| 2019/0128980 | A1 * | 5/2019 | Porter | G01R 33/5616 |

FOREIGN PATENT DOCUMENTS

| | | | | |
|---|---|---|---|---|
| CN | 107305243 B | * | 3/2020 | ......... G01R 33/3854 |
| DE | 19957767 A1 | * | 6/2000 | ........... G01N 24/081 |
| JP | H03149032 A | * | 6/1991 | |
| KR | 20180016892 A | * | 2/2018 | |
| WO | WO-2013095141 A1 | * | 6/2013 | ............. G01R 33/30 |
| WO | WO-2019191777 A1 | * | 10/2019 | ....... G06F 16/24578 |

OTHER PUBLICATIONS

Terpstra Melissa et al, "Detection of an antioxidant profile in the human brain in vivo via double editing with MEGA-PRESS", Magnetic Resonance in Medicine, vol. 56, No. 6, Nov. 6, 2006 (Nov. 6, 2006), p. 1192-1199, XP055928444, DOI: 10.1002/mrm. 21086, ISSN: 0740-3194.

Andreychenko Anna et al, "Efficient spectral editing at 7 T: GABA detection with MEGA-sLASER : Spectral Editing With MEGA-sLASER at 7 T", US Dec. 28, 2011 (Dec. 28, 2011), vol. 68, No. 4, p. 1018-1025, Retrieved from the Internet: URL:https://api.wiley.com/onlinelibrary/tdm/v1/articles/10.1002%2Fmrm.24131, XP055928660, DOI: 10.1002/mrm.24131, ISSN: 0740-3194.

Meijin Lin et al, "Two-dimensional J-resolved LASER and semi-LASER spectroscopy of human brain", Magnetic Resonance in Medicine, vol. 71, No. 3, Apr. 19, 2013 (Apr. 19, 2013), p. 911-920, XP055111195, DOI: 10.1002/mrm.24732, ISSN:0740-3194.

Harris Ashley D. et al, "Edited 1 H magnetic resonance spectroscopy in vivo: Methods and metabolites : Edited 1 H MRS", US Feb. 2, 2017 (Feb. 2, 2017), vol. 77, No. 4, p. 1377-1389, Retrieved from the Internet: URL:https://api.wiley.com/onlinelibrary/tdm/v1/articles/10.1002%2Fmrm.26619, XP055928667, DOI: 10.1002/mrm. 26619, ISSN:0740-3194, [retrieved on Jun. 7, 2022].

Magnusson P. O. et al., "GABA-edited echo-planar spectroscopic imaging (EPSI) with MEGA-sLASER at 7T", Proceedings of the International Society for Magnetic Resonance in Medicine, 25th Annual Meeting & Exhibition,No. 1255, Apr. 7, 2017 (Apr. 7, 2017), XP040688823.

Weng Guodong et al, "SLOW: A novel spectral editing method for whole-brain MRSI at ulta high magnetic field", US Mar. 28, 2022 (Mar. 28, 2022), vol. 88, No. 1, p. 53-70, Retrieved from the Internet: URL:https://onlinelibrary.wiley.com/doi/full-xml/10.1002/mrm.29220, XP055928381, DOI: 10.1002/mrm.29220, ISSN: 0740-3194, [retrieved on Jun. 7, 2022].

European Patent Office—Office Action issued in connection with European Patent Application No. 22714011.8—Nov. 13, 2024 (Munich, Germany).

European Patent Office—Office Action issued in connection with European Patent Application No. 22714011.8—Jun. 3, 2025 (Munich, Germany).

* cited by examiner

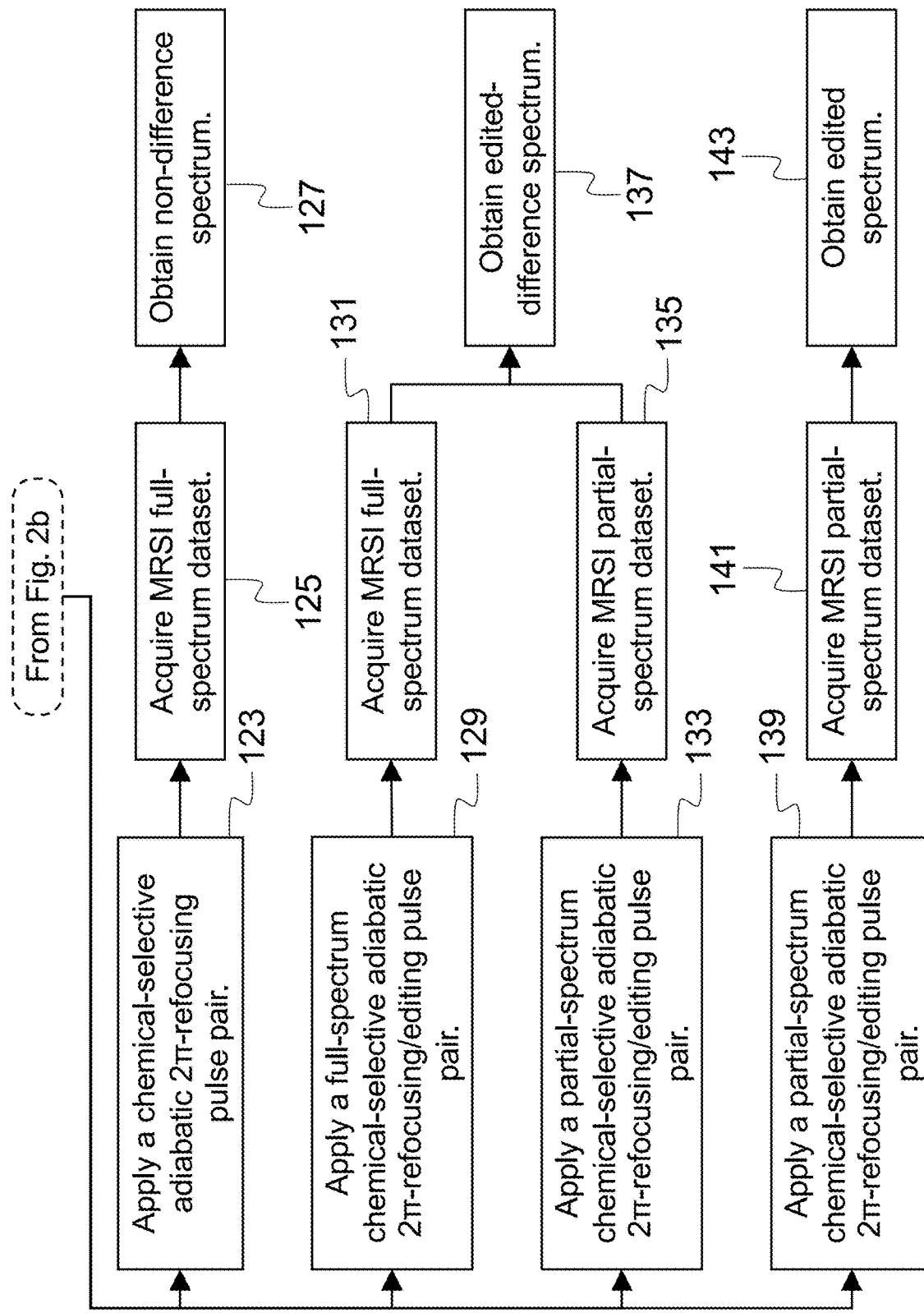

CHEMICAL-SHIFT-SELECTIVE PHASE-COMPENSATED ADIABATIC 2-REFOCUSING PULSE PAIR AND SPECTRAL EDITING METHODS FOR ULTRA-HIGH-FIELD MAGNETIC RESONANCE SPECTROSCOPY

FIELD OF THE INVENTION

The invention relates to localised magnetic resonance spectroscopy (MRS) and the processing of MRS data, for example in the localisation of J-coupled metabolites, such as 2-hydroxyglutarate (2HG), or γ-aminobutyric acid (GABA) or glucose (Glc) in in vivo scans of human tissues (e.g., brain). In particular, it relates to a chemical-shift-selective phase-compensated adiabatic 2π-refocusing pulse pair (2π-CSAP) based refocusing and chemical-shift-selective phase-compensated adiabatic 2π-refocusing pulse pair based spectral editing (2π-CSAP-based spectral editing) suitable for the next generation of ultra-high-field $^1$H-MRS.

BACKGROUND OF THE INVENTION

Magnetic resonance spectroscopy (MRS) is an analytical method that is designed to be used to identify and quantify certain metabolites in samples or areas of interest in the body. While relying on similar principles and using the same equipment, MRS differs from conventional magnetic resonance imaging (MRI) in the sense that the obtained spectra provide physiological and chemical information about the atoms and molecules in a sample (region) of interest to form an image, instead of spatially resolved anatomical and positional information. By exploiting the magnetic properties of certain atomic nuclei, MRS provides detailed information about the structure, dynamics, reaction state, and chemical environment of atoms or the molecules in which they are contained. Similar to MRI, MRS is typically performed by placing the object to be imaged at or near the isocentre of a strong, uniform magnetic field, $B_0$, also known as the main or static magnetic field. The main magnetic field causes those atomic nuclei (spins) that possess a non-zero spin number S, and thus have an associated magnetic moment, to become aligned with the main magnetic field $B_0$ obeying the Boltzmann distribution, resulting in detectable magnetisation. Consequently, this magnetisation precesses around the magnetic field direction $B_0$ at a rate proportional to the magnetic field strength.

If the magnetisation is perturbed by a radio frequency (RF) magnetic field, also known as $B_1^+$ magnetic field or RF pulse, the magnetization is tilted into the transverse plane and may emit RF radiation (also known as $B_1^-$) at characteristic frequencies, depending on the locations within molecules. This property, that the resonance frequency depends on the position of the spin within a molecule, is called chemical shift. Apart from the chemical shift, spins within one molecule can also interact with each other. This type of interaction (also called homonuclear scalar coupling) of the spins within one molecule is called J-coupling and the coupling-strength is determined by a coupling constant J. The SI unit of J is $sec^{-1}$ (Hertz), and for hydrogen spins it takes values in the range from -17.5 Hz to +10.0 Hz.

By applying a sequence of RF pulses with well-defined delay periods in between them, the (J-coupled) spins are manipulated in a specific way, and the emitted RF radiation can be detected and analysed to obtain information that may be used to identify and quantify specific targeted chemical compounds within an object, to thereby at the same time infer information about for example metabolic activity. Various techniques utilising specific sequences of RF pulses have been developed over the last at least 40 years. One of the techniques relevant to be mentioned here is called J-resolved spectroscopy. The technique emerged from the spin-echo pulse sequence which stepwise increased the delay time, i.e., the echo time. A two-dimensional (20) dataset was measured as a function of echo time, and by means of a 2-dimensional Fourier transformation not only the chemical shift but also the scalar J-coupling constants could be resolved in the 2D spectra that results from them. Although this approach can make weak resonances of spins (short "resonances") visible hidden by stronger resonances, this approach is not feasible for largescale all-day clinical applications due to long measurement times. Another technique was developed that utilises the fact that if two different J-coupled spins are refocused by the same RF-pulse(s), the dephasing due to small differences in resonance frequencies is refocused, but the evolution due to J-coupling is not restored (signal1). However, in case only one of the two J-coupled spins is hit by the additional editing pulse(s) (narrow band 180-degree pulse(s)), both dephasing due to small differences in resonance frequencies is refocused and the evolution due to J-coupling is restored (signal2). Subtraction of the two signals has shown to be powerful way to eliminate strong resonances from non-J-coupled spins overlapping with low concentration J-coupled spin systems. This technique is called J-difference editing, also known as MEGA-editing.

MEGA-based spectral editing of in vivo MRS data must be combined with at least one broadband refocusing pulse. In practice, MEGA-based editing is often combined with a localisation method like for example PRESS or semiLASER. The performance of these types of sequences does not unconditionally scale if going to higher $B_0$ for instance 7 Tesla (T) or higher. The increased signal-to-noise ratio (SNR) at 7 Tesla compared to 3 Tesla, for example, does not translate into better performance. The reasons for this can be found in physics. The observed in vivo wavelength (≈11 cm at 7 T) of $B_1^+$ is typically shorter than the anatomic structures to be examined, which often results in (severe) interference patterns (inhomogeneities) in the excitation RF field $B_1^+$ having spatial-dependent signal cancellation (destructive interference) and hot spots (constructive interference). The specific absorption rate (SAR) scales by the square of the static magnetic field $B_0$, and this especially presents a (severe) problem for in vivo scanning of MRI and especially for localised MRS. $B_1^+$-inhomogeneities can partially be overcome by using adiabatic RF pulses or by using parallel transmit techniques. However, due to practical limitations of RF amplifiers, the maximum obtainable RF field $B_1^+$ amplitude is also quite limited. The high SAR of spatial-selective adiabatic refocusing pulses (as in LASER or semiLASER) limits not only the number of pulses which can be used per time unit, but it also drastically restricts the RF bandwidth ($\Delta\omega_{RF}$) which can be used in vivo. Limitations in $\Delta\omega_{RF}$ directly lead to larger chemical shift displacement artefacts (CSDA). Moving from 3 T to 7 T requires a 2.3-fold increase in required $\Delta\omega_{RF}$, necessary to maintain equal CSDA. Therefore, the limited in vivo availability of RF bandwidth, to meet maximal tolerable SAR limits, acceptable CSDA, and clinically acceptable acquisition times, conspire to make spatial-resolved MRS extremely challenging with traditional approaches. Although semiLASER was developed for localised MRS at ultra-high frequency (UHF), the enormously high SAR of slice-selective adiabatic phase compensated 2π-pulse pair (2π-SSAP) imposes very strong limitations on its use (long measurement times), significantly counteracting the benefit of increased SNR at UHF.

WO2014121065A1 describes an example of editing and refocusing methods in which pairs of slice-selective adiabatic pulses are used for 2π-refocusing. However, as mentioned above, such methods, which rely on spatial-selective refocusing for metabolite signal localisation, have the inherent disadvantage of high SAR, high CSDA and consequent limitations on the number of scans that can be performed per time unit, and the volume of tissue which can be scanned in any particular period of time, leading to excessive acquisition times.

BRIEF DESCRIPTION OF THE INVENTION

The present invention aims to overcome at least some of the above disadvantages of prior art methods. To this end, methods according to the invention are described in the attached claims 1 and 2, and an apparatus according to the invention is described in claim 13, and a data carrier in claim 14. Further variants of the invention are described in the dependent claims.

Because the editing and the refocusing are carried out by a narrow band chemical-shift-selective phase-compensated adiabatic 2π-refocusing pulse pair (2π-CSAP), not requiring any further broadband (spatial-selective) refocusing whatsoever, the specific absorption rate (SAR) is massively lower than in MEGA (typically by a factor of 10 or more). Since the editing and refocusing pulse are the same, the SAR is further reduced. The inventive methods provide greatly improved sensitivity to weak metabolites such as 2HG, GABA, phosphor-ethanolamine (PE), Glucose (Glc), Glutamate (Glu), Glutamine (Gln) and others. Other advantages include: adiabatic spin-lock occurs during the long (tens of ms) echo times (TEs); insensitivity to inhomogeneous $B_1^+$; very flat baseline thanks to implicit water and lipid suppression and reduction of unwanted signal aliasing; less maximum RF peak power is required (reduced technical requirement on RF amplifiers), thanks to narrower RF bandwidth (hundreds of Hz rather than multiple thousands of Hz); shorter total acquisition times (shorter repetition times due to lower SAR requirement); substantially reduced spectral ghosting artefacts and flat baseline, therefore easier spectral quantification. Finally, the 2π-CSAP does not impose any CSDA which enables unambiguous interpretation of the data.

While the invention is illustrated with applications in brain scanning, it may instead be used for measuring other J-coupled metabolites in other organs, such as citrate in the prostate, or acetyl carnitine in muscle tissues.

BRIEF DESCRIPTION OF THE DRAWINGS

The invention will be described in detail with reference to the attached drawings, in which:

FIGS. 2a to 2c show a flow chart illustrating the proposed MRS process according to the present invention.

Figure 1:
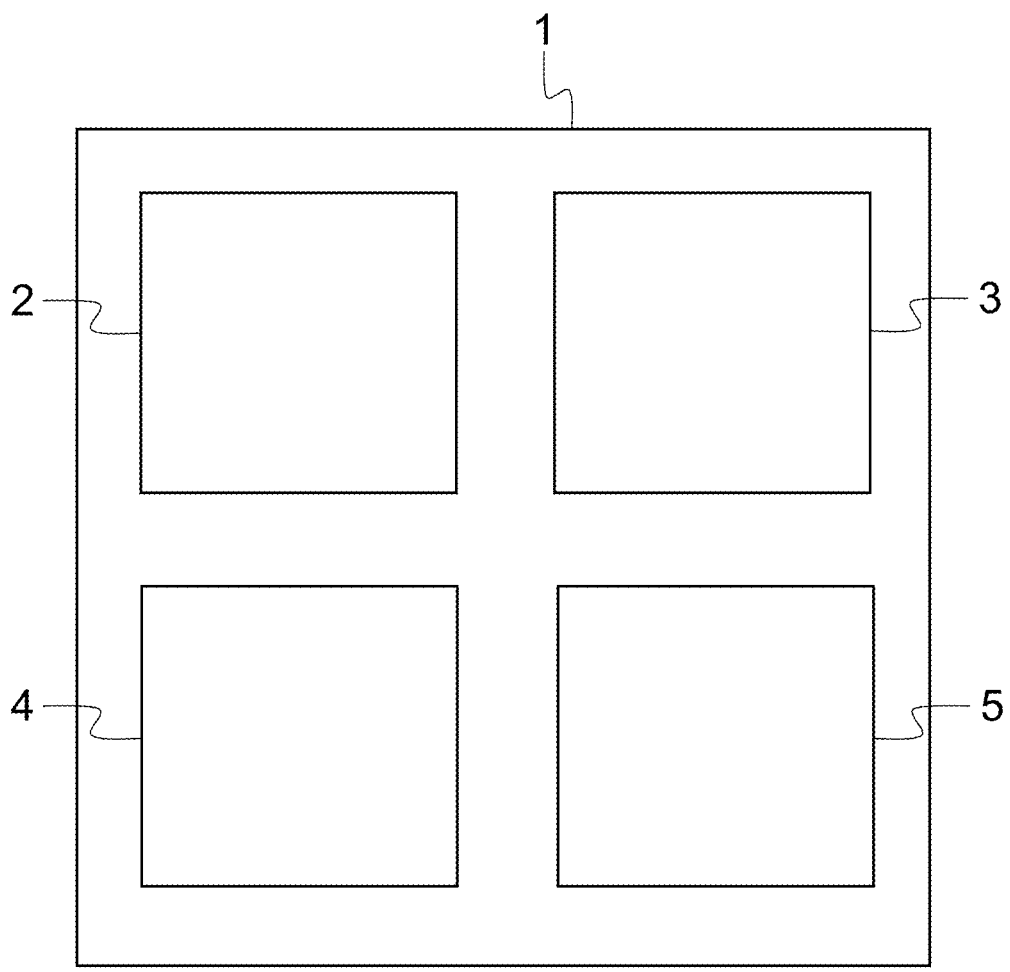
FIG. 1 is a block diagram illustrating a magnetic resonance scanning apparatus that may be used to implement at least some of the steps of the proposed MRS process according to the present invention.

It should be noted that the figures are provided merely as an aid to understanding the principles underlying the invention and should not be taken as limiting the scope of protection sought. Where the same reference numbers are used in different figures, these are intended to indicate similar or equivalent features. It should not be assumed, however, that the use of different reference numbers is intended to indicate any particular degree of difference between the features to which they refer.

DETAILED DESCRIPTION OF THE INVENTION

Some notations relating to the present invention are first explained below.

Nuclear magnetic resonance (NMR), or simply magnetic resonance is the phenomenon in which nuclei of atoms (called spins) that are positioned within a magnetic field can absorb electromagnetic energy of certain frequencies only, referred to as resonance frequencies.

The spins that absorbed energy will emit this energy sooner or later afterwards. In this set of definitions, spins refer to protons or hydrogen nuclei. The emitted energy is also of electromagnetic nature and is called an induced NMR signal or an MR signal.

Electromagnetic energy is, for all human applications, applied to the substance under examination in the so-called radio frequency (RF) band of the electromagnetic spectrum. The RF energy is not constantly applied to the nuclei of the substance, but only during short time intervals. The RF energy is applied to the substance as an RF pulse. RF pulses can be applied such that they have time-varying RF energy levels during the RF pulse. If an RF pulse has a time-varying amplitude and is applied at a constant frequency, then this RF pulse is called an amplitude-modulated (AM) RF pulse. On the other hand, if the frequency of an RF pulse is modulated, then this RF pulse is called a frequency-modulated (FM) RF pulse. If both amplitude and frequency of an RF pulse are modulated, then this RF pulse is called an AM/FM RF pulse.

Under certain conditions AM/FM RF pulses can act or behave in a so-called "adiabatic" way. An RF pulse that is amplitude-modulated only can never act in an adiabatic way. An RF pulse is called adiabatic if its effect on the spins is independent of the RF amplitude level of the RF pulse. Adiabatic performance is obtained only in a certain RF amplitude range, in which the RF amplitude is above a certain minimum RF amplitude level, and below a certain maximum RF amplitude level. During an adiabatic RF pulse, the angle between the effective field vector that is composed of $|B_1^+(t)|$ and the offset frequency $\Delta\omega(t)$ and the magnetisation does not change: the magnetisation is said to be spin-locked to the RF pulse.

A certain rotation angle is associated to the effect of every RF pulse. This rotation angle is the angle by which a statistical ensemble of spins (called magnetisation) is rotated with respect to the axis which is parallel and points in the same direction as the main magnetic field.

A 2π pulse is an RF pulse that rotates the magnetisation over 2π radians (i.e. 360°). An adiabatic 2π pulse rotates the spin-locked magnetisation over 2π radians in an adiabatic way. If two identical AM/FM adiabatic RF pulses, each having a rotation angle of π radians are applied one after the other in time, the concatenation of these two identical RF pulses is called a phase-compensated adiabatic 2π pulse pair.

An AM RF pulse which rotates the equilibrium magnetisation over α-radians ($0<\alpha\leq\frac{1}{2}\pi$) is called an excitation pulse. Magnetisation which is rotated over $\alpha=\frac{1}{2}\pi$ (i.e., to the main magnetic field) is called pure transverse magnetisation since it does not have any longitudinal (parallel to $B_0$) component. After an excitation pulse is applied, the magnetisation rotates around the magnetic field vector. This rotation is also called precession and has a specific frequency (called resonance frequency). Small differences in resonance frequencies leads to an MR signal decay because the spins loose phase coherence.

A refocusing pulse is a pulse which rotates the transverse magnetisation in the ideal case over $\alpha=\pi$ radians. A refocusing pulse restores the phase coherence of previously dephased spins thus restoring the MR signal. The MR signal after application of a refocusing pulse is called a "spin echo".

The bandwidth of an RF pulse is inversely proportional to the RF pulse duration, but to obtain the same flip angle, the amplitude should proportionally be increased.

The effect of an RF pulse on the rotation of magnetisation is offset-dependent. In first order for small rotation angles $\alpha\leq\frac{1}{4}\pi$, the offset dependent effect of the RF pulse is defined by the Fourier transformation of the RF pulse defined in time domain.

Adiabatic RF pulses also act in a certain chemical-shift (offset) frequency range, namely $\Delta\omega_{RF}$, which can be defined by proper pulse parameter selection. One of the most robust adiabatic refocusing pulse shapes is the so-called complex-valued secant hyperbolic RF pulse, which can mathematically be described as $B_1^+(t)=\Omega_0 \operatorname{sech}(\beta t)^{1+\mu i}$, where $\Omega_0$ is the reference RF amplitude, t is the time, i is the imaginary unit of a complex number, and μ, β are the parameters determining the pulse bandwidth. If applied in the adiabatic range, that means $\Omega_{0,min}<\Omega_0<\Omega_{0,max}$, the bandwidth of such a pulse is $\Delta\omega_{RF}=\mu\beta/\pi$ Hz around the resonance frequency $\omega_0$ or $\omega_{center}$ on which it is applied.

Biomolecules mostly contain differently bound hydrogen atoms (also referred to as chemically differently bound), which resonate due to their position in the molecule on different frequencies. These different resonance frequencies are denoted as different chemical shifts.

If an RF pulse is applied to the substance, which excites only certain spins of the molecule under investigation, this RF pulse is said to be "chemical-shift-selective" or "chemically selective". A pulse which is chemical-selective and refocuses the spins is said to be a chemical-selective refocusing pulse.

A collection of different spins in a biochemical molecule is called a spin system. The resonance frequency of a certain spin is often influenced by other spin(s) of the spin system depending on the distance between and the orientation of the spins. The spin system is thus said to be coupled. J-coupling is a special type of coupling, which occurs in nearly all spin systems within biomolecules. If a chemical-selective refocusing pulse is applied to all the targeted resonances of a J-coupled spin system, then only the dephasing due to chemical-shift differences is refocused but the evolution of the spin system due to J-coupling is not refocused. If a chemical-selective refocusing pulse is applied to a subset of the coupled spins, then the dephasing due to chemical shift as well as the evolution of the spin system due to J-coupling are both refocused. The other spin(s), which is/are outside the bandwidth $\Delta\omega_{RF}$ of the chemical-shift selective refocusing pulse, is not refocused, and cannot be detected anymore.

In the original MEGA-based spectral editing approach at least two measurements are performed. During the first measurement, both spins of a J-coupled spin system are refocused by a slice-selective RF pulse, whereas during the second measurement, two additional chemical-selective refocusing pulses (also known as MEGA editing pulses) are applied on only one of the coupled spins. The two MR signals (also referred to as response signals) that result from these two measurements are subtracted. The difference signal is a so-called "edited signal". The Fourier transform of the edited signal yields the edited J-difference spectrum.

A magnetic field gradient is a magnetic field that linearly increases the magnetic field strength as a function of distance from the isocentre of the magnet in a specific direction. There are three magnetic field gradients: one in the x-coordinate direction (from ear to ear in a person lying on their back in the magnet), one in the y-direction from the front of the head till back of the head, and one in the z-direction, i.e., in the direction from the feet to the head. A magnetic field gradient, or short "gradient" can be switched on and off during a selectable number of time intervals during any pulse sequence. It can also be played out having variable strengths (so-called "magnetic field gradient strengths") on an MR scanner. The Si unit of gradient strength is "Hz/m" or $[m^{-1}s^{-1}]$.

If the spectrum of an RF pulse has only a constant value in a certain chemical-shift frequency range, and if this RF pulse is applied to magnetisation, then this RF pulse is said to be frequency band selective or short band selective. If a band-selective RF pulse is applied simultaneously while a magnetic field gradient is switched on, this RF pulse only excites magnetisation in those spatial locations where the frequency band of the RF pulse is located. A band-selective RF pulse which is applied simultaneously while a magnetic field gradient is switched on is called a spatial-selective RF pulse. A refocusing pulse which is applied while a magnetic field gradient is switched on as well, is called a spatial-selective refocusing pulse, or a slice-selective refocusing pulse since it selects a slice of the subject/phantom. If the same refocusing RF pulse is applied in the absence of a field gradient, then this pulse acts as a chemical-shift-selective RF pulse.

RF response range is the frequency range $\Delta\omega_{RF}$ around a central frequency $\omega_{centre}$ in which an RF pulse acts. Depending on whether or not a magnetic field gradient is switched on or off, the same RF pulse acts as a spatial-selective RF pulse (gradient switched on), or as a chemical-shift-selective RF pulse. The effect of the $\omega_{centre}$ selection influences the position of the selected slice if used as a spatial-selective pulse, or the frequency in the spectrum of the RF pulse if used as a chemical-shift-selective RF pulse.

The inventive approach comprises variable bandpass editing (VBE) and/or it uses one or more chemical-shift-selective adiabatic 2π-pulse pairs, also referred to as chemical-selective adiabatic 2π-pulse pairs for both refocusing and spectral editing. The inventive spectral editing approach is denoted as SLOW editing. SLOW is a compound acronym referring to the names of the inventors. As VBE, it can be performed using one or two different 2π-refocusing/editing pulse pair(s) centred around one of more resonance frequencies $\omega_{cente,i}$, which can be built into any spatial readout scheme. In the case of two pulse pairs, the bandwidth of the first 2π-refocusing/editing pulse pair should refocus substantially all the targeted spins of a J-coupled spin system to be edited, whereas the second 2π-refocusing/editing pulse pair should refocus only a part of the spin system. This requires the selection of one set of $\{\Delta\omega_{RF},\omega_{centre}\}$ pair or two sets $\{\Delta\omega_{RF,1},\omega_{centre,1}\}$ and $\{\Delta\omega_{RF,2},\omega_{centre,2}\}$. The acquisitions of the two measurements are stored separately and subtracted to provide a signal containing the edited spectrum.

In contrast to MEGA editing, SLOW has not an "on" (on resonance) and "off" (off resonance) states, but two different "on" states in which the two RF pulse pairs refocus two different chemical-shift frequency ranges (denoted by "full" $\{\Delta\omega_{RF,1}, \omega_{centre,1}\}$ and "partial" $\{\Delta\omega_{RF,2}, \omega_{centre,2}\}$), and the process does not require any additional (slice-selective) refocusing pulses. In contrast to MEGA using AM Gaussian-shaped MEGA pulses, SLOW has a spatially homogeneous editing performance due to the use of adiabatic refocusing/editing RF pulses. In contrast to MEGA, SLOW editing does not need any further broadband (spatial-selective) refocusing RF pulses, additionally to the refocusing/editing pulses. When combined with echo-planar spectroscopic imaging (EPSI) readout (i.e., a specific readout to obtain spatial-resolved spectra), SLOW makes the use of high SAR spatial-selective refocusing pulse(s) superfluous, resulting in substantially lower overall SAR. The lower SAR enables us to further optimise other parts of the sequence (e.g., adding more lipid suppression pulses). In contrast to MEGA, SLOW has an implicit additional water and lipid suppression, which has a further significant beneficial effect on the spectral quality and the ability to perform spectral quantification on the data by reducing its associated spectral artefacts and ghosting. For at least one application, namely for glucose (Glc), the use of one single $2\pi$-refocusing/editing pulse pair that refocuses only a part of the spin system is already sufficient (referred to as "single-shot SLOW"). No signal subtraction is required in this case.

At least some of the findings of the present invention may be carried out by a magnetic resonance scanning apparatus 1, also referred to as a magnetic resonance (MR) scanner, as schematically shown in FIG. 1. The apparatus comprises an excitation module 2 or excitation means for imparting one or more excitation pulses to the subject material. The apparatus also comprises a refocusing module 3 or refocusing means configured to impart an adiabatic $2\pi$-refocusing pulse pair to the subject material. An acquisition module 4 or acquisition means is also provided, which is configured to acquire MRS response signals from the subject material. The apparatus 1 further comprises an editing module 5 or editing means configured to generate the refocusing pulses as a phase-compensated, chemical-shift-selective adiabatic $2\pi$-refocusing pulse pairs with mutually time-shifted pulses. The editing module 5 is also configured to post-process the acquired signal to carry out spectral editing of the acquired MRS response signals as explained later.

Figure 2A:
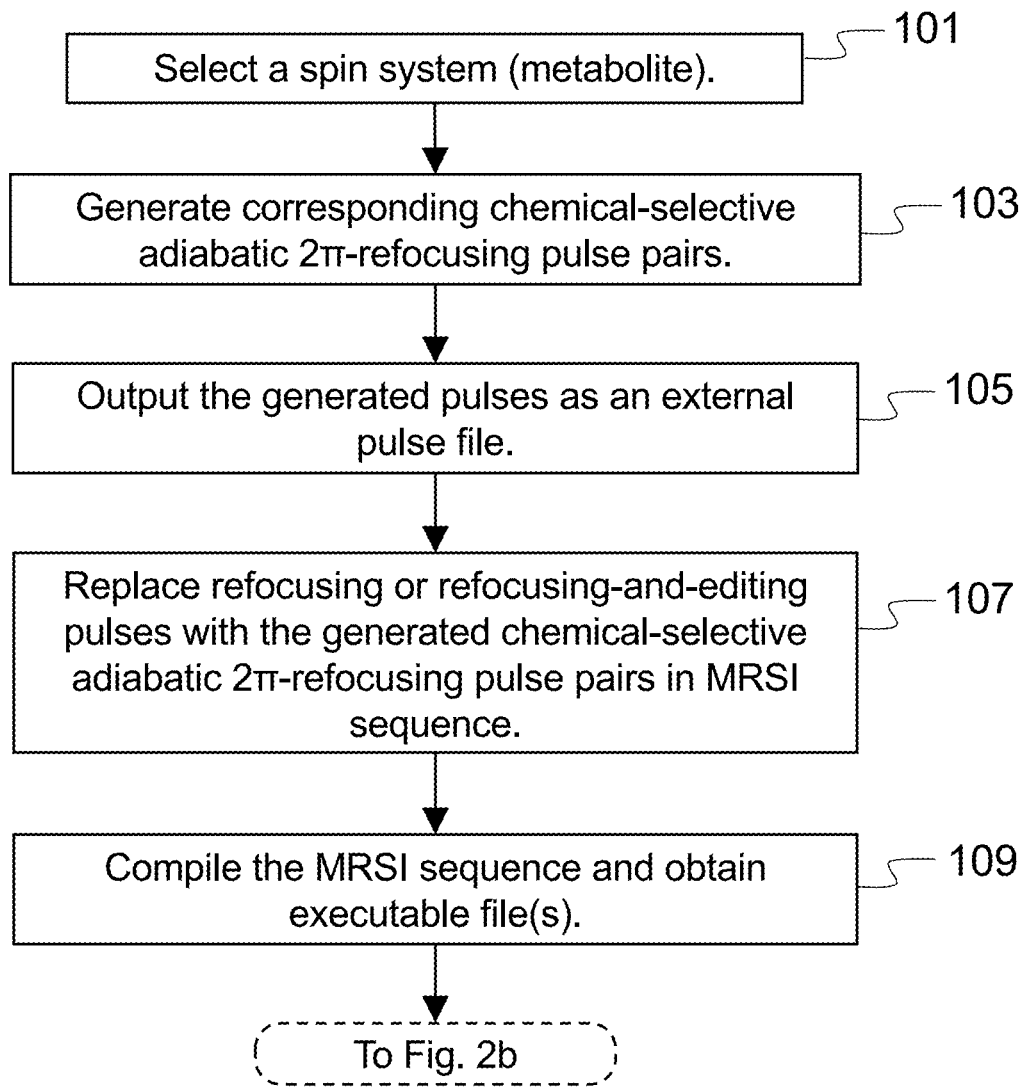
Figure 2B:
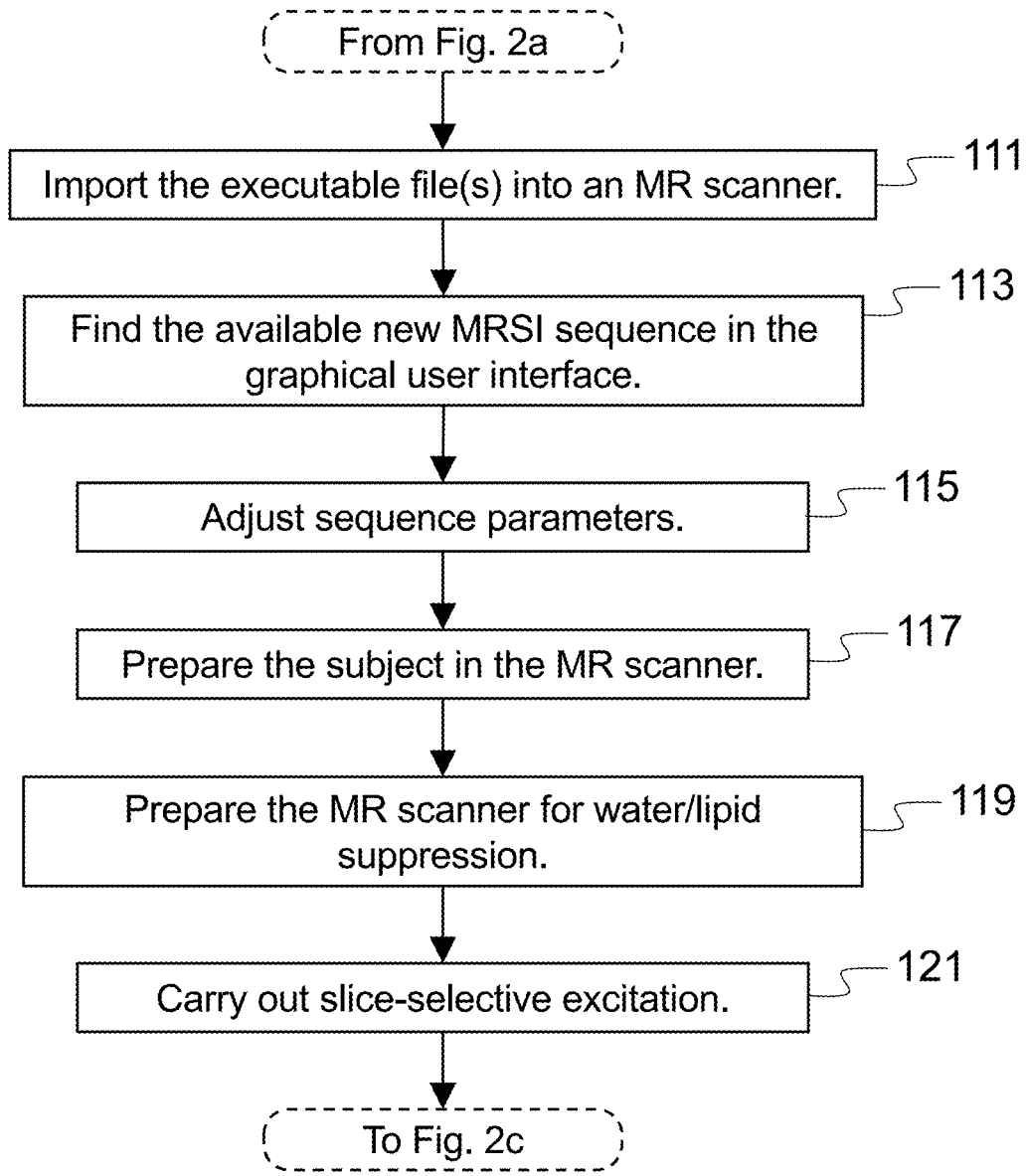
Figure 3:
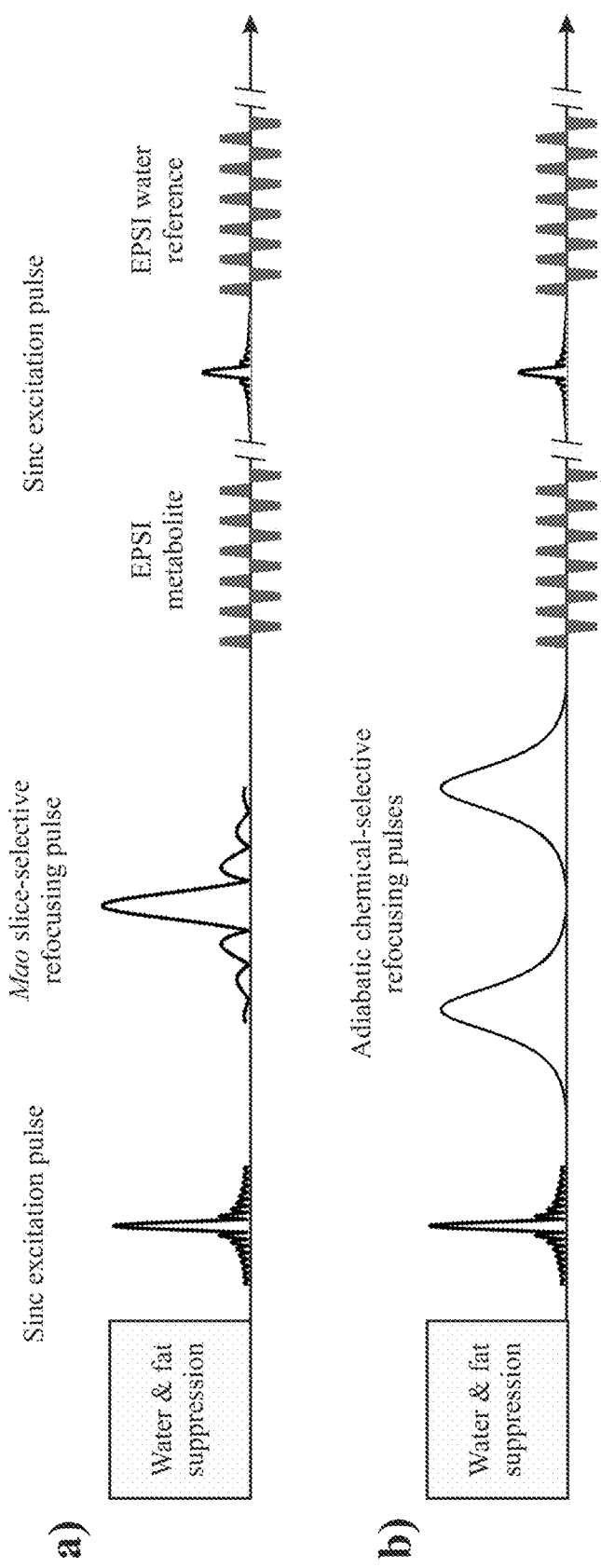
FIGS. 3 to 7 illustrate a first example case study, as described below.
Figure 4:
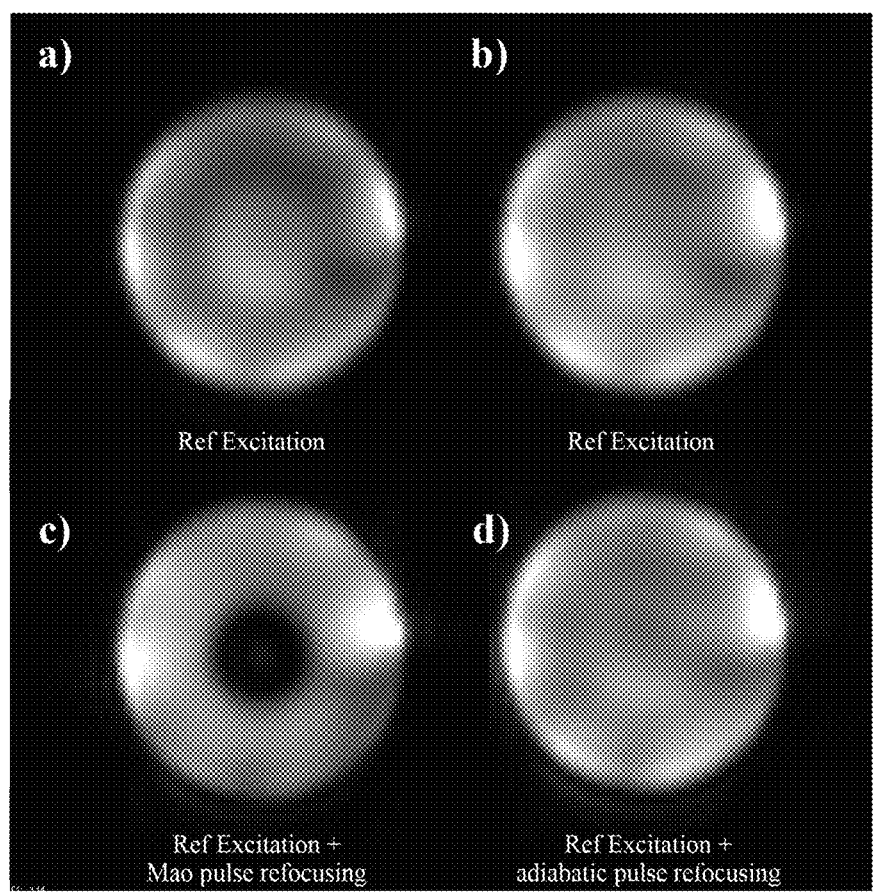
Figure 4:
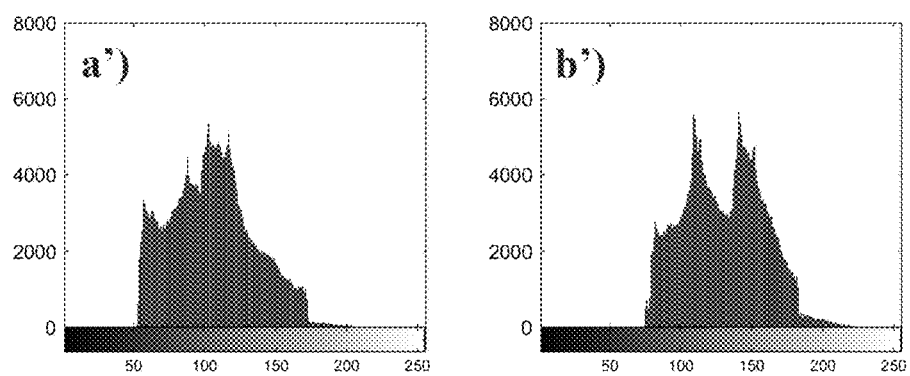
Figure 4:
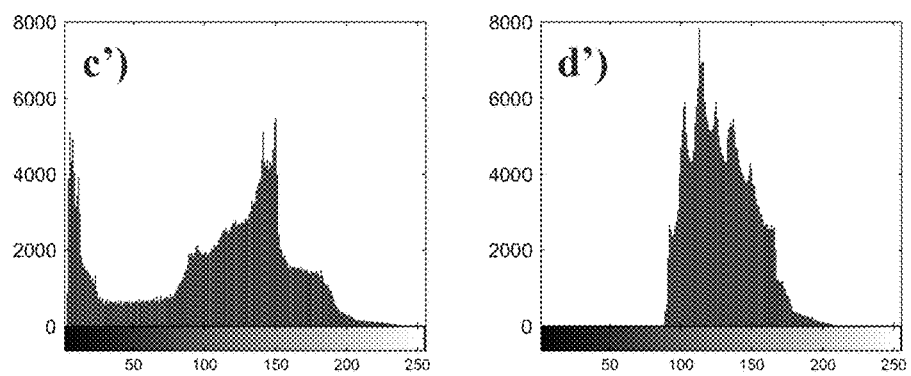
Figure 5:
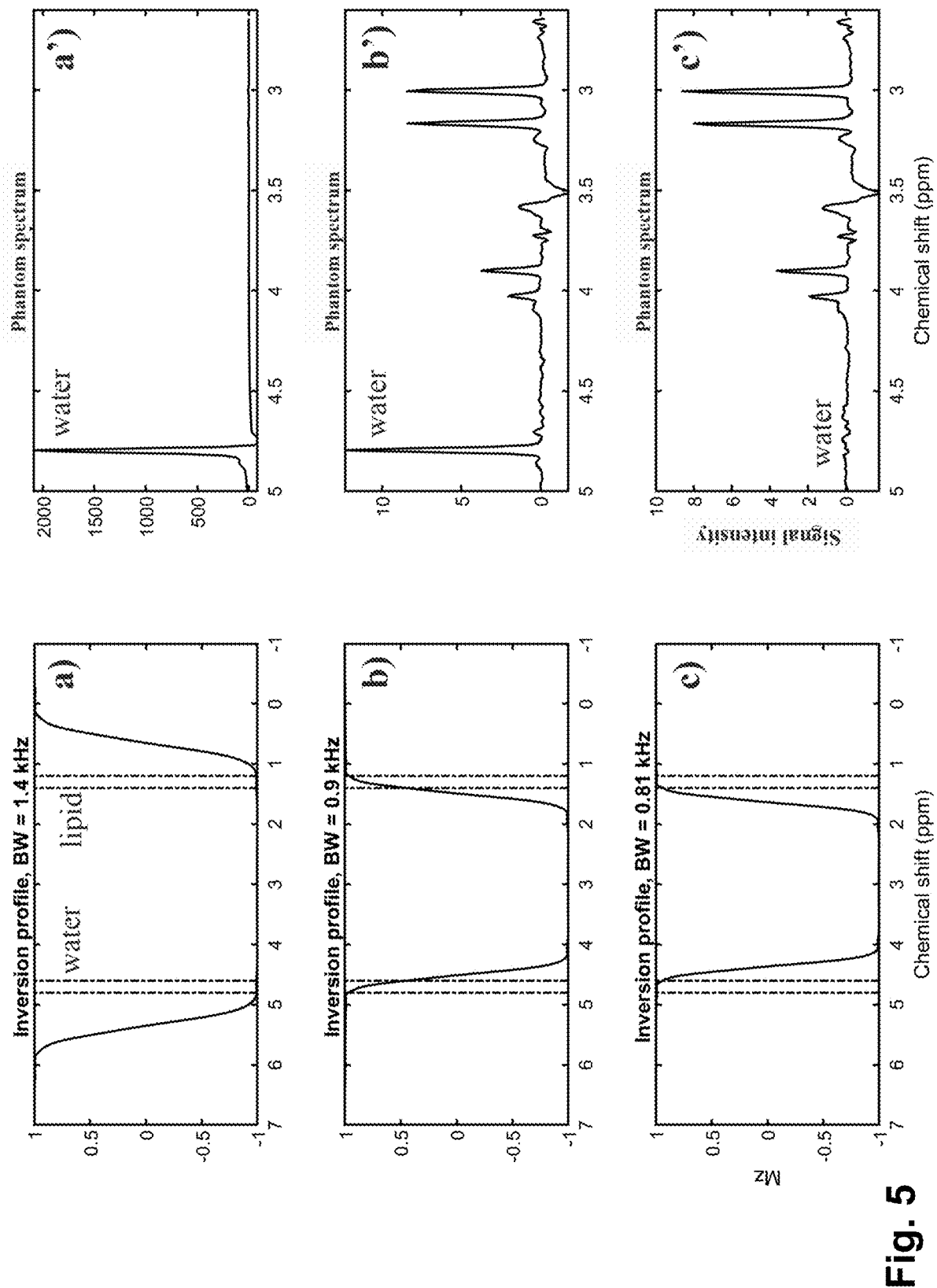
Figure 6:
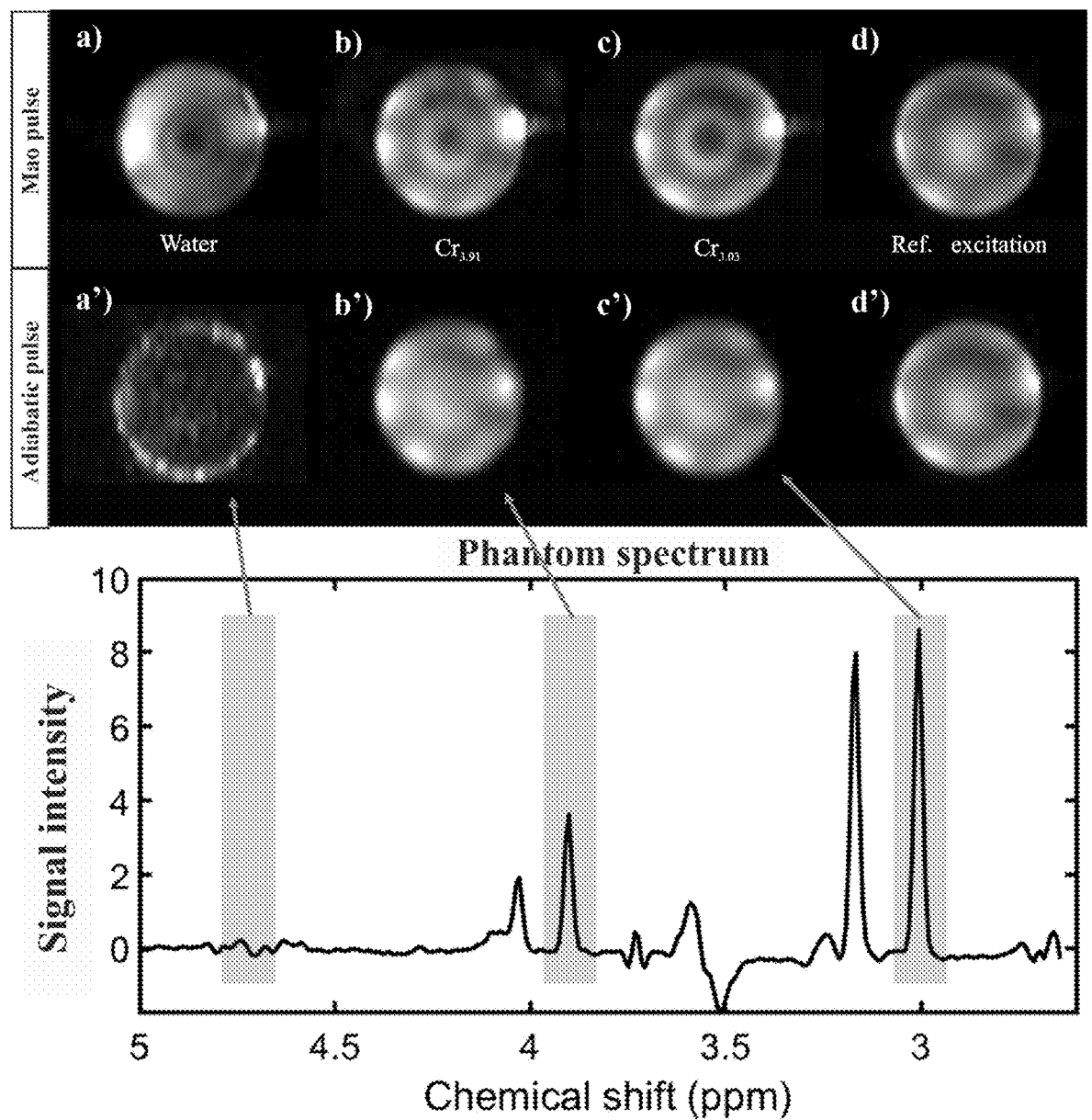
Figure 7:
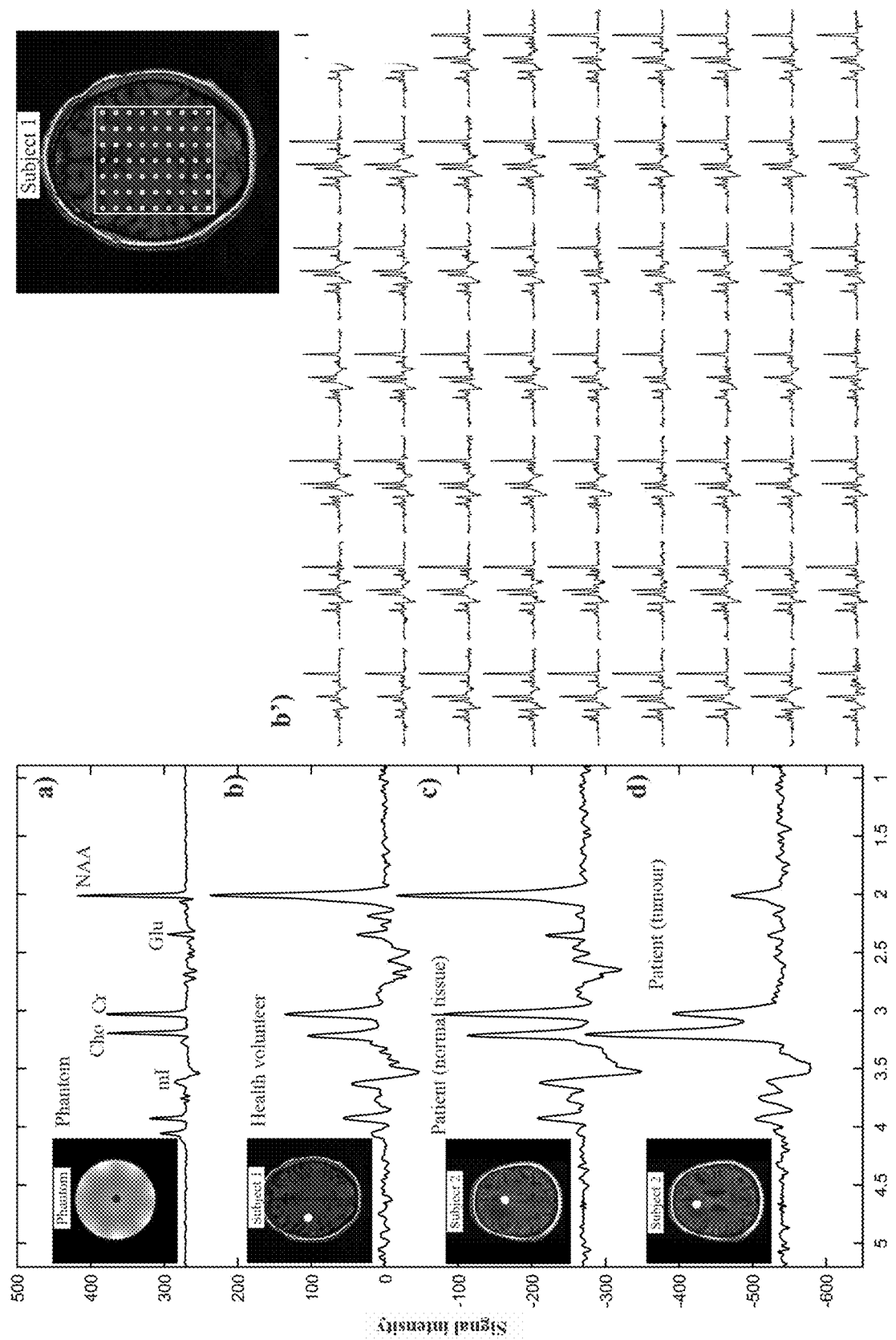
Figure 8:
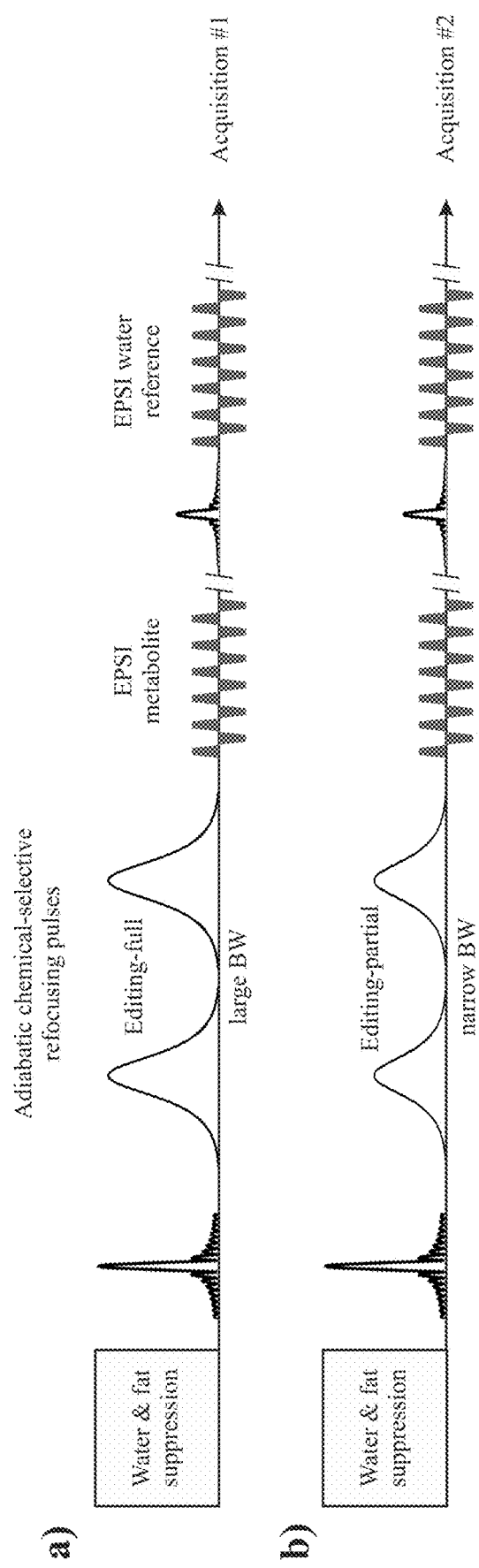
FIGS. 8 to 12 illustrate a second example case study, as described below.
Figure 9:
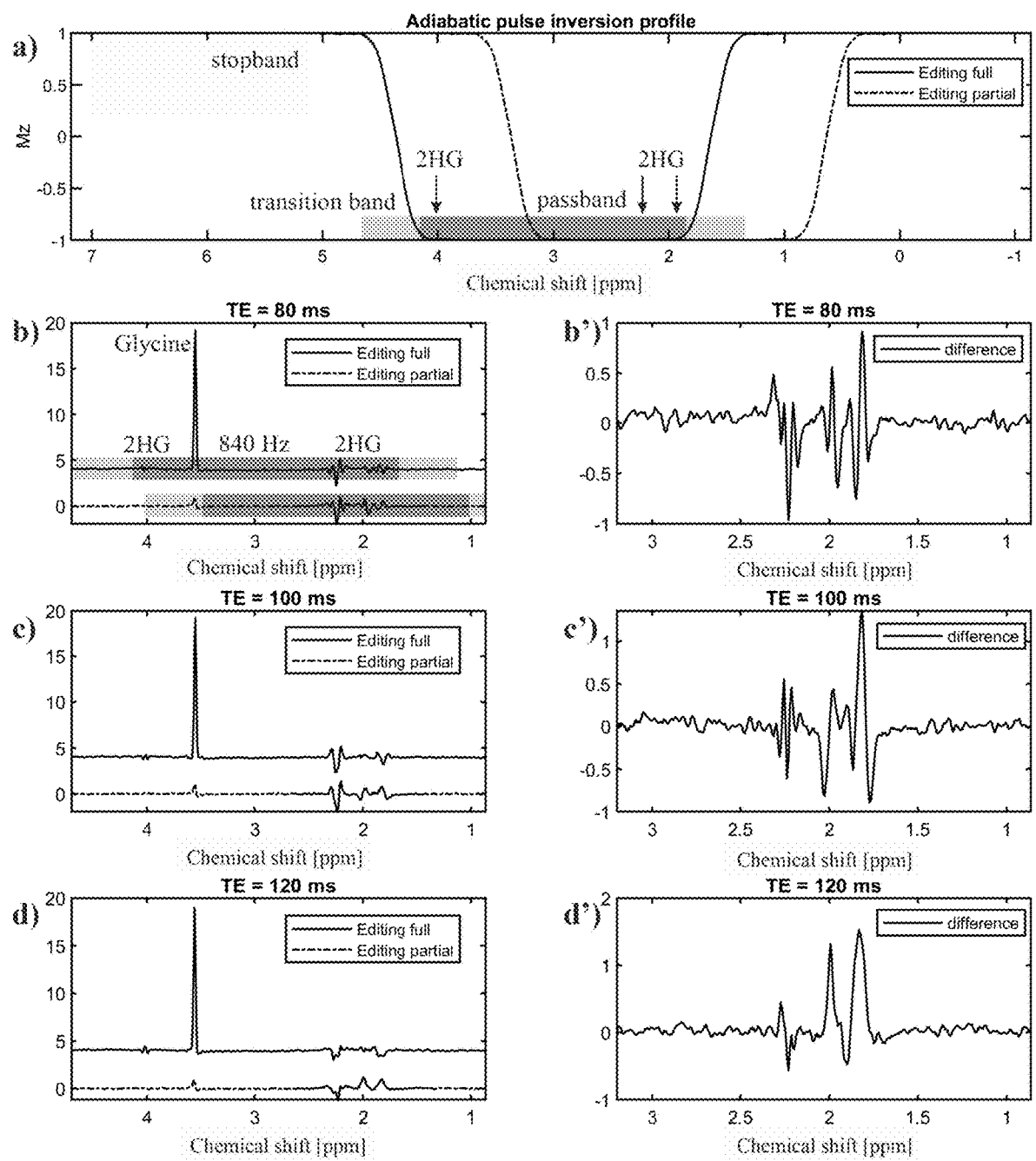
Figure 10:
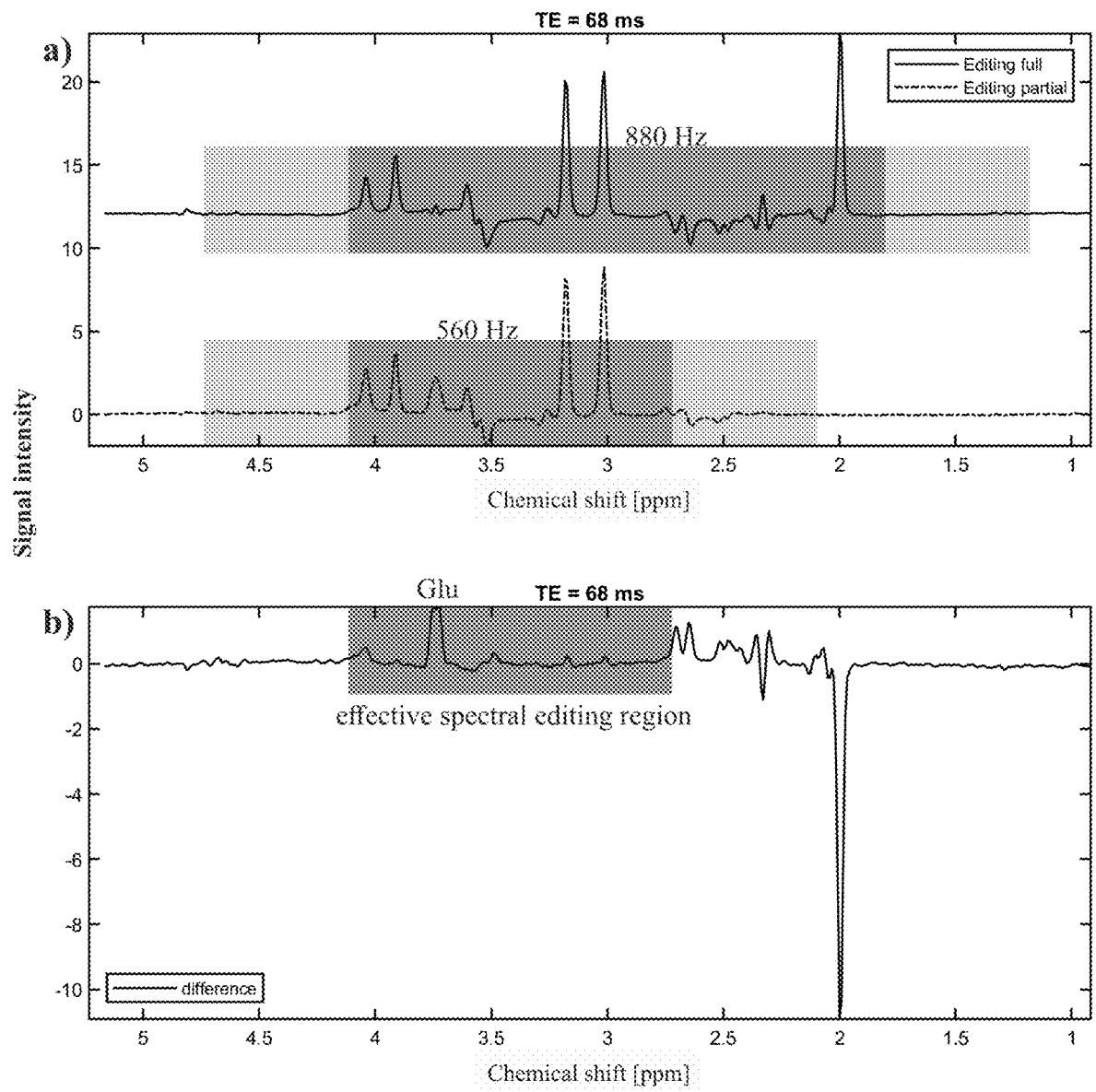
Figure 11:
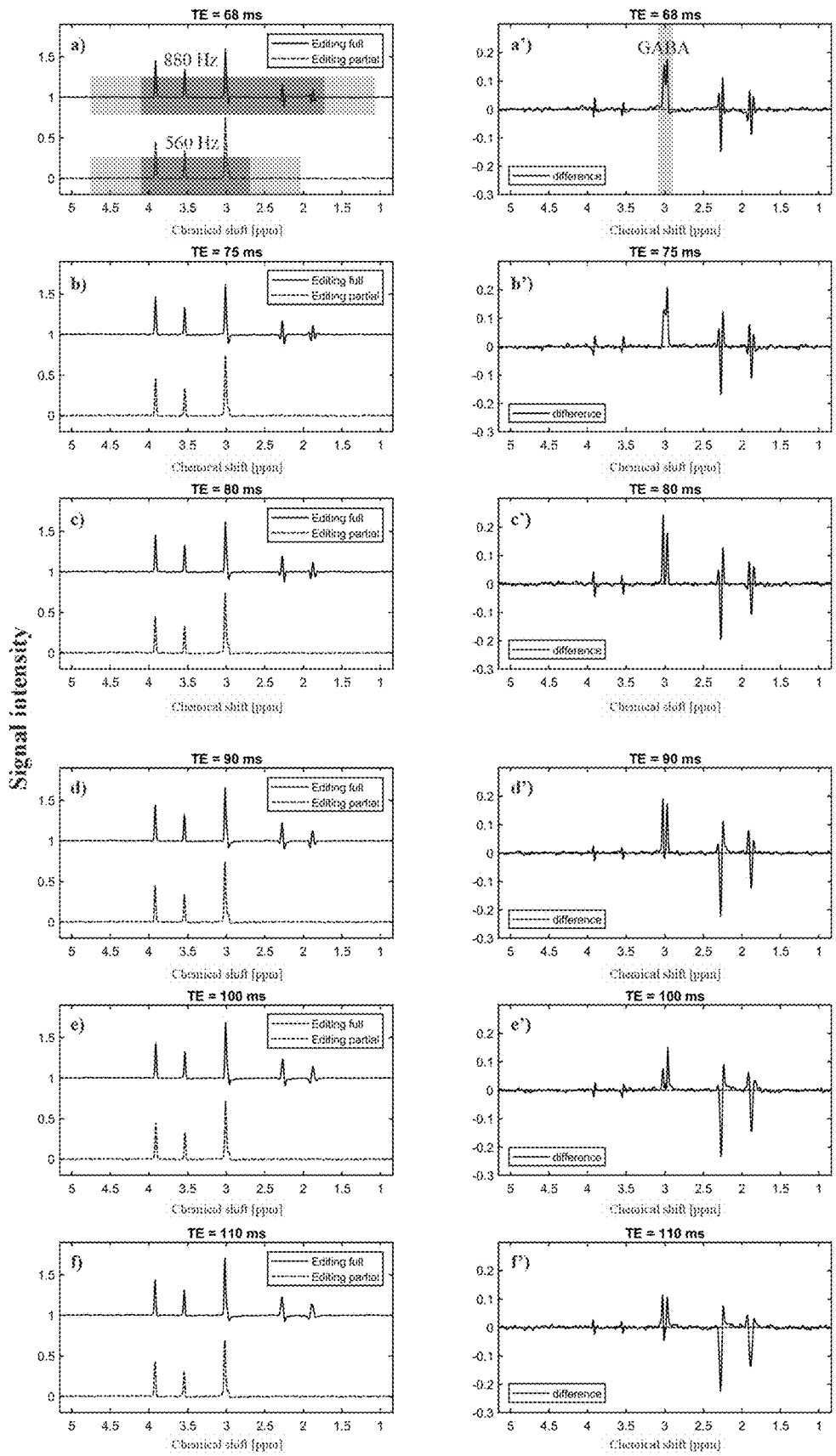
Figure 12:
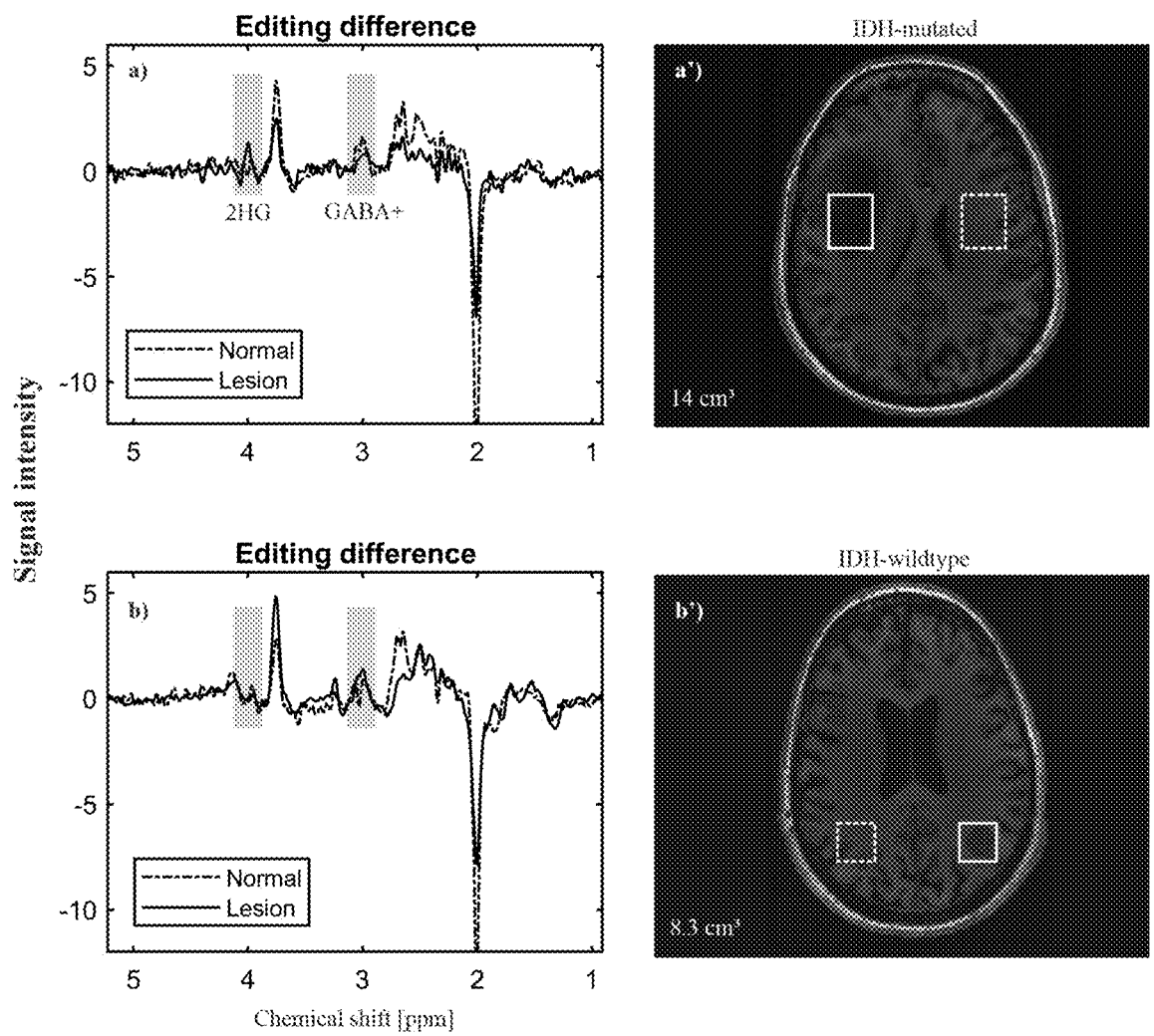

The flow charts of FIGS. 2a to 2c illustrate some examples of the proposed method in more detail. In step 101, a J-coupled spin system (i.e., the metabolite) to be examined is selected. This selection is in this example made by the user. In step 103, respective chemical-shift-selective adiabatic $2\pi$-pulse pairs ($2\pi$-CSAPs) to refocus/edit the selected spin system are designed or generated by a computing apparatus. For instance, the SLOW-full pulses are configured to cover all the targeted J-coupled spins, while SLOW-partial pulses only cover a part of the J-coupled spins. Note that the targeted J-coupled spins of a spin system (metabolite) are not necessarily al J-coupled to each other. In the process of designing the pulses, they may be simulated with acquisition. In step 105, the generated pulses are output as an external pulse file (for instance as a "pta" file). In step 107, refocusing or refocusing-and-editing pulses in a magnetic resonance spectroscopy (imaging) (MRS(I)) sequence are replaced with the generated $2\pi$-CSAPs. In step 109, the magnetic resonance spectroscopy (imaging) (MRS(I)) sequence is compiled to obtain executable files (for instance "dll" and/or "so" flies). Steps 101 to 109 can be considered to form a pulse sequence design phase.

In step 111, the executable files are imported into a magnetic resonance (MR) scanner 1, which is configured to conduct the MRS process. In step 113, the available new sequence is searched and found in the graphical user interface of the MR scanner 1. In step 115, sequence parameters are adjusted, in this case by the user. The parameters that may be adjusted may include at least any one of the following parameters: echo time (TE), repetition time (TR), and targeted metabolite that can be edited (if any). Steps 111 to 115 can be considered to form a pulse sequence implementation phase.

In step 117, the subject, i.e., the patient, is prepared in the MR scanner. This includes positioning the subject and the measuring coils in the right position. This step may also optionally include α-glucose and/or ß-glucose intake (oral intake) and/or infusion (intravenous infusion) by the patient before measurement. In step 119, two or more water/lipid suppression pulses are applied to the patient. In step 121, slice-selective excitation of the subject is carried out. The excitation comprises a proton excitation. Alternatively, the excitation comprises a nucleus other than protons, or is part of a heteronuclear excitation pulse sequence. In step 123, refocusing is carried out by using one chemical-shift-selective adiabatic $2\pi$-refocusing pulse pair, which is configured to cover all the targeted J-coupled and non-coupled spins, i.e., the full chemical-shift selection frequency range of the targeted spins of the subject. In this step all spins which are dephased due to small differences in resonance frequencies are refocused, while the evolution of J-coupled spins is not restored. The targeted spectrum is a composite of resonances associated to coupled and non-coupled spins, and the evolution of J-coupled spins usually results in lower MR signals compared to the situation where the evolution is restored. Because the targeted spin system is a composite of coupled and non-coupled spins, and the non-coupled spins do not have J evolution and are not edited by the pulse, the final obtained result is called non-edited spectrum. In step 125, an MRSI dataset is acquired, in other words in this case an MRSI full-spectrum dataset is acquired. In step 127, a non-edited spectrum is obtained as final result. The process carried out in steps 123 to 127 can be referred to as a $2\pi$-CSAP MRSI. In this step the robustness to $B_0/B_1^-$ and the implicit water lipid suppression of the $2\pi$-CSAP is utilised.

Instead of the $2\pi$-CSAP MRS(I), a so-called SLOW MRS(I) can be carried out, as illustrated in steps 129 to 137. In step 129, refocusing is carried out by using a first chemical-shift-selective adiabatic $2\pi$-refocusing pulse pair, which is configured to cover all the targeted J-coupled spins, i.e., a full chemical-shift selection frequency range of the targeted spins of the subject (a first predetermined chemical-shift frequency range). In other words, a $2\pi$-CSAP SLOW-full refocusing operation is carried out. In step 131, an MRS(I) dataset is acquired, which is the editing full dataset, also referred to as a #1 dataset or first MRS(I) response signal. In step 133, chemical-selective adiabatic $2\pi$-refocusing is carried out by using a second chemical-shift-selective adiabatic $2\pi$-refocusing pulse pair, which is configured such that it refocuses only a part of the J-coupled spin system, i.e. only a partial selection of the chemical-shift spectral range is excited by the RF pulse applied to the subject (a second predetermined chemical-shift frequency range, different from the first chemical-shift frequency range). The first chemical-shift frequency range is larger than the second chemical-shift frequency range, which may be a subset of the first chemical-shift frequency range. In other words, a 2π-CSAP SLOW-partial refocusing operation is carried out. It is to be noted that SLOW-full does not necessary cover the entire RF response range of a metabolite. A metabolite could have for instance three or more coupled spins. SLOW-full could cover two of them, while SLOW-partial could cover only one of them. In step 135, an MRS(I) dataset is acquired, in other words in this case an MRS(I) partial-spectrum dataset, also referred to as a #2 dataset or a second MRS(I) response signal, is acquired. In step 137, a post-editing operation is carried out. In this case an edited-difference spectrum is obtained as a result of a mathematical comparison of the acquired first and second response signals. More specifically, the mathematical comparison comprises subtracting the first response from the second response or the second response from the first response to obtain the so-called J-difference edited response. Before the mathematical subtraction, a fast Fourier transformation of the first and second response signals is carried out. In the SLOW MRS (I), steps 129 and 133 can be carried out in parallel, i.e. simultaneously or substantially simultaneously (interleaved). Steps 131 and 135 may also be carried out in parallel, i.e. simultaneously or substantially simultaneously once the refocusing operation of the preceding steps have been carried out (interleaved).

Instead of the 2π-CSAP MRS(I), or the SLOW MRS(I), a so-called single-shot SLOW MRS(I) can be carried out, as illustrated in steps 139 to 143. In step 139, refocusing is carried out by using one chemical-shift-selective adiabatic 2π-refocusing pulse pair, which is configured to cover only a part of the targeted J-coupled spin system, i.e. a partial chemical-shift selection frequency range of the targeted spins of the subject. In other words, a 2π-CSAP SLOW-partial refocusing operation is carried out. In step 141, an MRSI dataset is acquired, in other words, in this case an MRS(I) partial-spectrum dataset is acquired. In step 143, a post-editing operation is carried out to obtain an edited spectrum, which consists of a fast Fourier transform only. The single-shot SLOW MRS(I) is suitable for measurement of α-glucose levels. It is to be noted that steps 127 to 143 can be considered to form a measurement phase. Compared to steps 123, 125 and 127, a subset of targeted J-coupled spins is refocused and the evolution due to J-coupling is restored, resulting in higher phase coherence of the subset of coupled spins resulting in higher SNR. Importantly, there are no other intense spins overlapping with the subset spin(s), thus a subtraction with SLOW-full spectrum is not necessary. Because the main targeted spins are J-coupled spins, the result is called edited spectrum.

The principles of the invention will be further described with reference to four case studies below. The case studies are illustrative of the invention, and not intended to imply any particular limitations.

Figure 13:
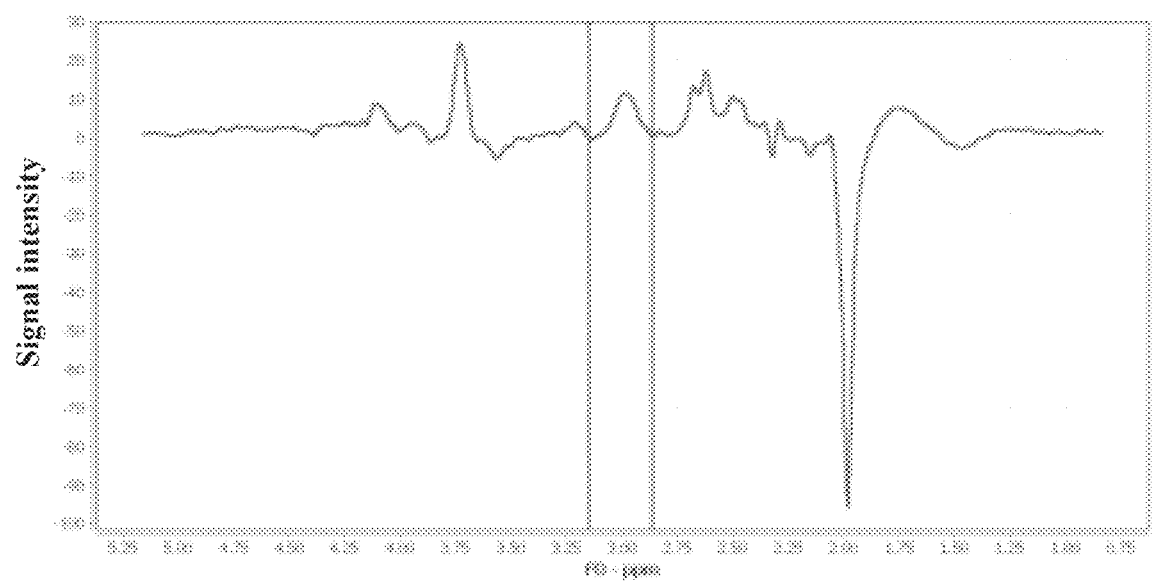
FIGS. 13 and 14 illustrate a third example case study, as described below.
Figure 13:
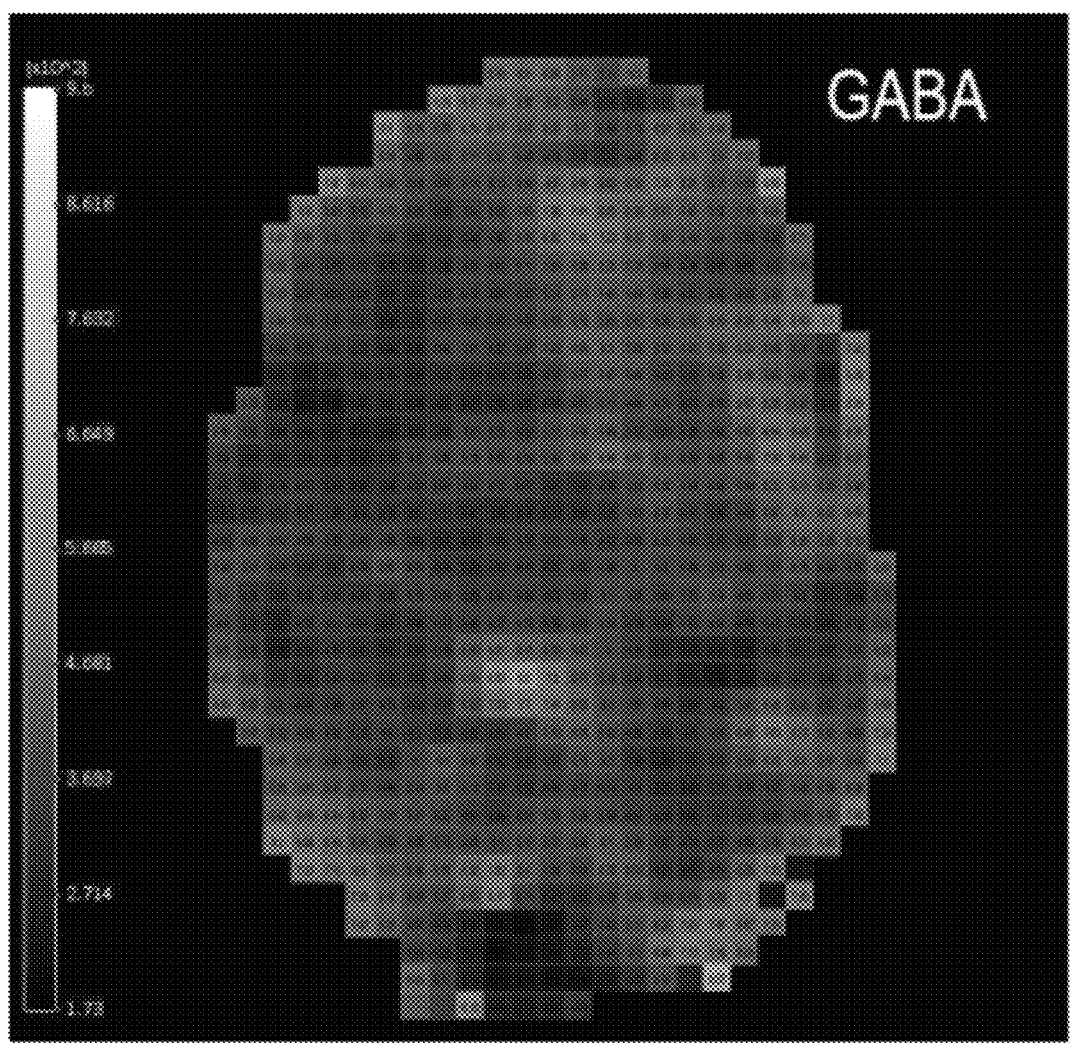
Figure 14:
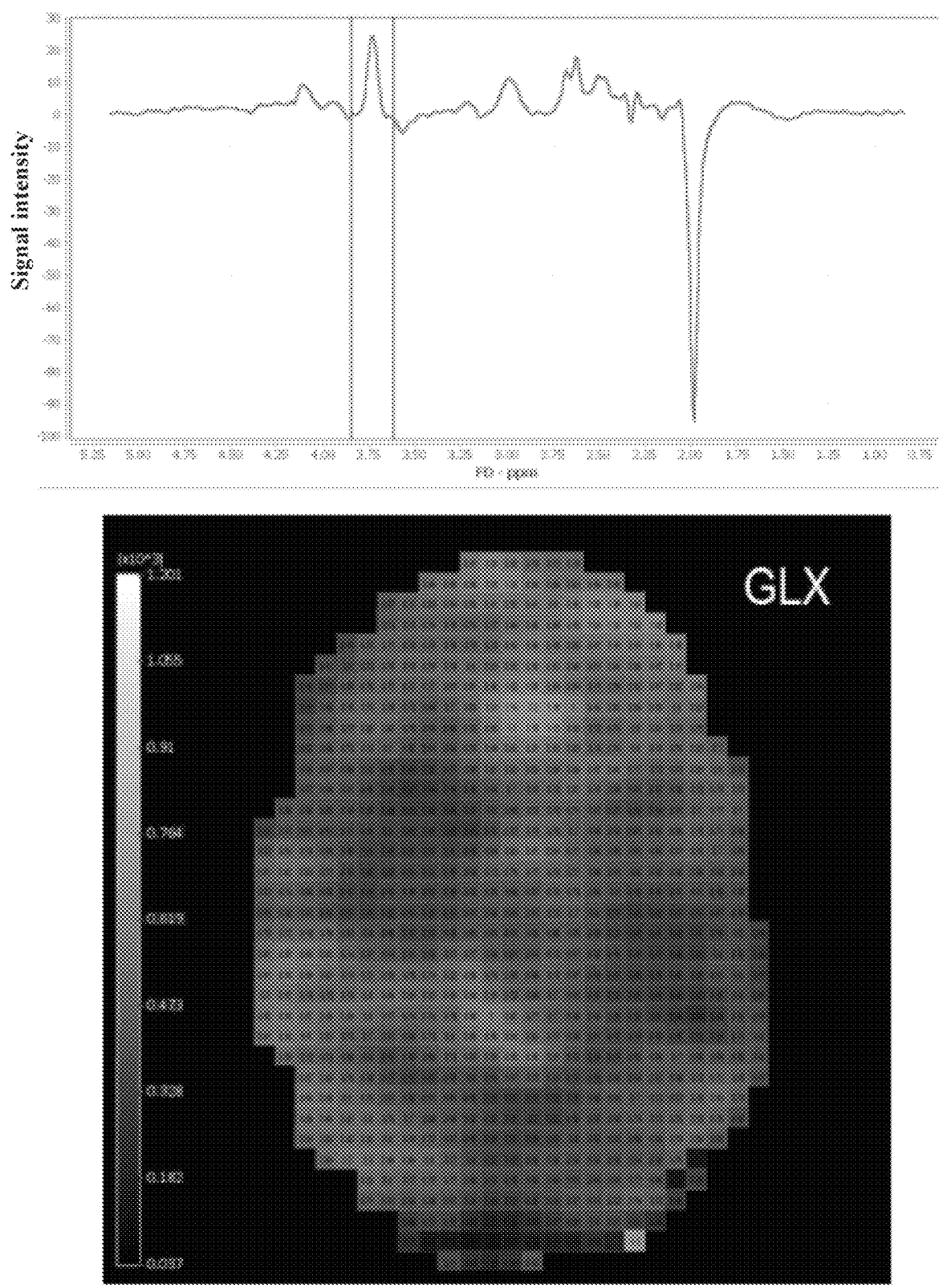
Figure 15:
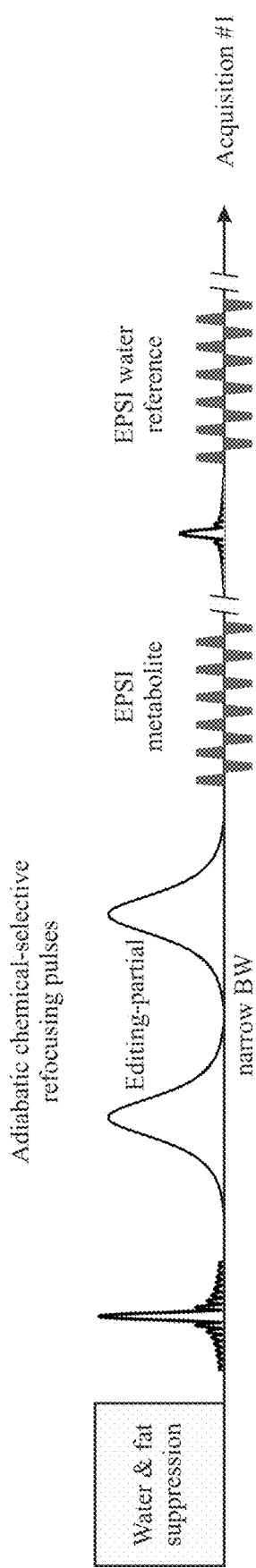
FIGS. 15 to 17 illustrate a fourth example case study, as described below.
Figure 16:
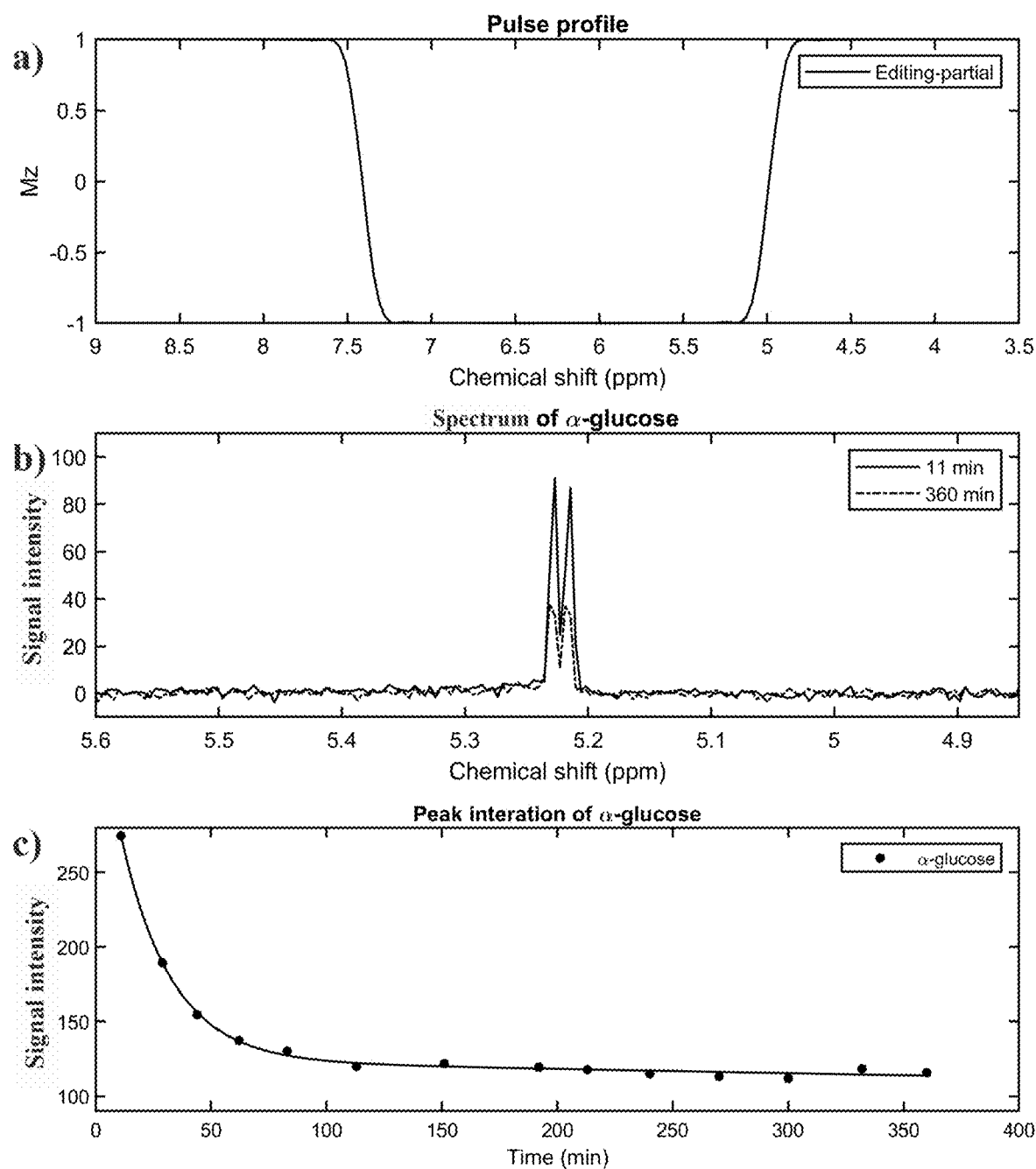
Figure 17:
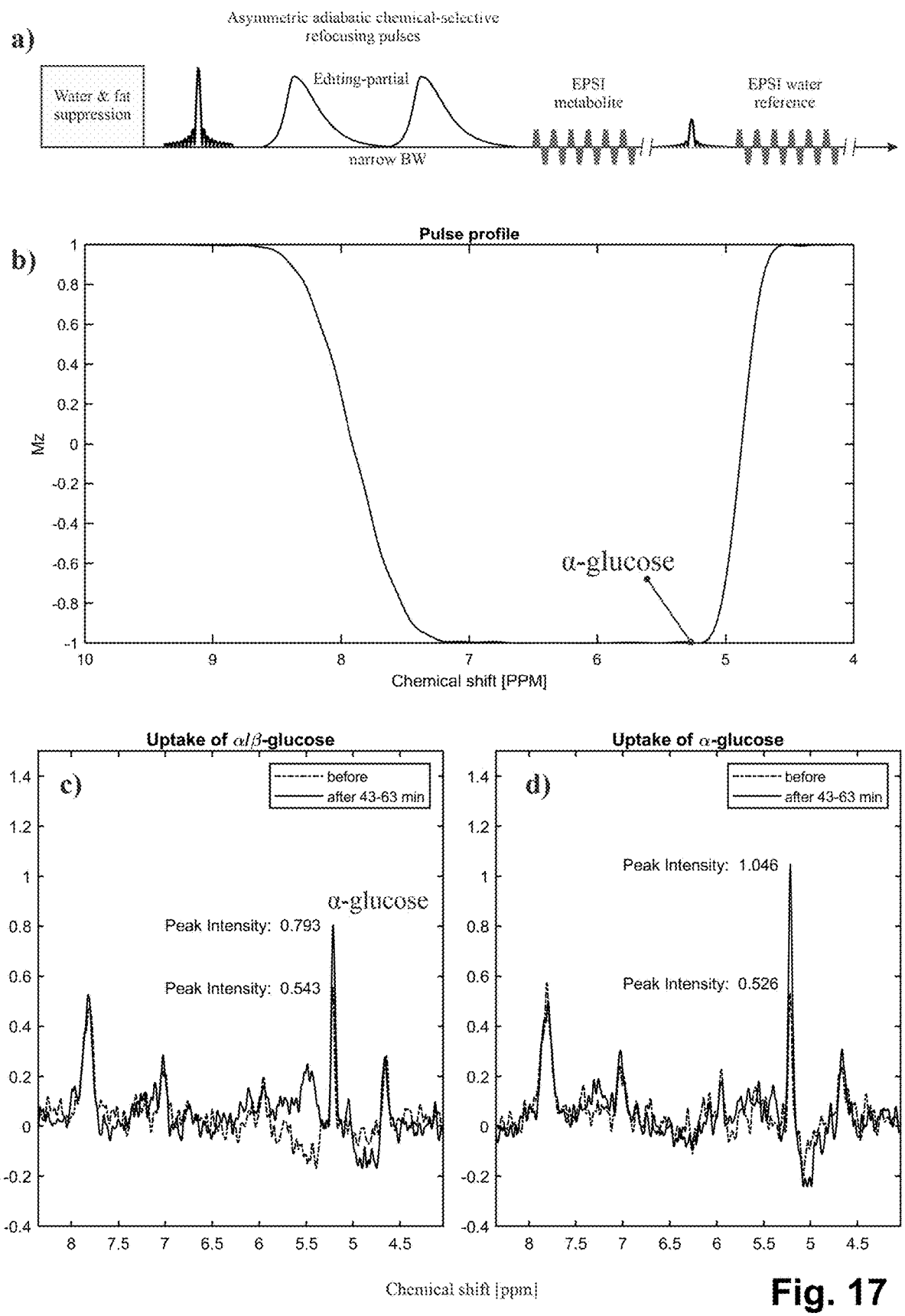

Case study I relates to FIGS. 3 to 7, case study II relates to FIGS. 8 to 12, case study III relates to FIGS. 13 and 14 and, finally, case study IV relates to FIGS. 15-17. For example, while the VBE technique is advantageously used with phase-compensated chemical-shift-selective adiabatic 2π-refocusing pulse pairs, VBE could be used with other refocusing techniques. Similarly, the chemical-shift-selective adiabatic 2π-refocusing technique could be used with spatial localisation and/or spatial readout techniques. For instance, all the presented case studies advantageously use EPSI as spatial readout technique.

Case Study I

Implicit water- and lipid-suppression is obtained using chemical-shift-selective adiabatic refocusing pulses in long TE whole brain echo-planar spectroscopic imaging (EPSI) at 7 T. At ultra-high magnetic field (≥7 T), four major factors that impose restrictions on the application, interpretation, and quantification/data-interpretation of the EPSI data are: $B_1^+$-inhomogeneity, challenging water and lipid signal suppression together with accompanying artefacts, strong in vivo limitations on the available RF peak power related to resulting SAR, and CSDA. However, the use of adiabatic (refocusing) pulse schemes minimises the effect of $B_1^+$-inhomogeneity (even in circular polarisation (CP) mode) and, additionally, since the SAR and bandwidth of adiabatic RF pulses can be controlled by the adaptation of applied pulse time, it gives adiabatic pulse schemes a clear advantage over purely amplitude-modulated RF pulse schemes, where required peak power scales with the RF bandwidth. Finally, CSDA can be minimised by avoiding the use of spatial-selective RF pulses. So, conventional slice-selective (adiabatic) refocusing pulses in the available EPSI pulse sequences were replaced by spectral-selective adiabatic complex secant hyperbolic pulses in an adapted EPSI pulse scheme.

According to an example of the present invention, the slice-selective AM 180-degree refocusing pulse (as shown in FIG. 3a) can be replaced by two identical chemical-shift-elective 180-degree secant hyperbolic adiabatic pulses $B_1^+(t)=\Omega_0 \text{sech}(\beta t)^{1+\mu i}$ as shown in FIG. 3b. Specifically, in this example, the bandwidth (BW) of the adiabatic pulses is set to 0.8 kHz (i.e. 2.7 ppm), and the carrier frequency was set to 3.0 ppm. The BW of the non-adiabatic excitation pulse is 5.5 kHz (18.5 ppm), i.e., greater than the BW of the adiabatic pulses. In vitro tests were carried out on two spherical phantoms, and in vivo tests on healthy volunteers and patients (glioma). For the in vitro studies, two phantoms were measured (a brain metabolite phantom, and a 2HG-containing phantom). The 2HG phantom contains approximately 7.8 mmol/L 2HG and 18 mmol/L Glycine as non-J-coupled internal reference.

In the original implementation of EPSI, an AM slice-selective Mao refocusing pulse is used, having a bandwidth of 1.25 kHz (limited by maximum available RF amplitude). The chemical-shift displacement of the Mao refocusing is 297/1250=23.7% per ppm. For the non-selective adiabatic pulses, the chemical-shift displacement, determined by the excitation pulse, is 297/5500=5.4% per ppm. Therefore, the chemical-shift displacement error (sometimes also called artefact) CSDA is reduced by approximately 1−5.4/23.7=77%. Due to the absence of the CSDA of the chemical-shift-selective adiabatic refocusing, the variation of the spectral patterns of metabolites over the total excited volume is much smaller.

FIGS. 4a to 4d show the water signal-Integration maps using the two sequences displayed in FIGS. 3a and 3b. Compared to the results obtained with the Mao pulse (FIG. 4c), the water map obtained by the chemical-shift-selective adiabatic 2π-refocusing pulse pair (FIG. 4d) is in good correspondence with the water-only excitation reference maps (FIGS. 4a and 4b). This strongly indicates that, despite the $B_1^+$-inhomogeneity of the single channel (1Tx (transmission), circular polarisation (CP) mode) RF head coil, the performance of the proposed adiabatic refocusing obtained by the usage of the chemical-selective adiabatic 2π-pulse pair is close to ideal. The histograms of the water amplitude over the selected volume (a square area in the centre of phantom, not shown for simplicity) are shown in FIGS. 4a' to 4b', which further indicate that the adiabatic 2π-pulse pair leads to spatially more homogeneous excitation distributions and therefore to results that are easier to interpret. The reason for this is found in the fact that above a certain minimal RF amplitude, adiabatic pulses become $B_1^+$-insensitive and flip the magnetisation independent of the pulses' RF amplitude. The smaller the bandwidth (BW), the lower this amplitude threshold is, and the lower the required SAR is. Since the BW of the proposed chemical-shift-selective adiabatic $2\pi$-pulse pair is very much lower than that of adiabatic phase-compensated slice-selective adiabatic $2\pi$-refocusing pulse pair ($2\pi$-SSAP) of the same type (as used in (semiLASER), the SAR of SLOW editing is only a fraction of that of MEGA in combination with semiLASER.

Three adiabatic pulses with different BWs were applied to investigate their performance on a spherical phantom (FIGS. 5a to 5c and FIGS. 5a' to 5c'). FIG. 5c shows that nearly perfect water suppression is achieved with water signal suppression factor of ≥1000 compared to FIG. 5a. In addition, due to the symmetry of BW about 3 ppm, the same suppression performance is expected for the fat region (0.9 to 1.3 ppm).

FIGS. 6a to 6d and FIGS. 6a' to 6d' show the water and creatine (both 3.7 and 3.0 ppm) integration maps as well as water reference maps using the Mao and adiabatic pulses, respectively. FIG. 6a' presents the noise-like water map which emphasises an overall homogeneous water suppression compared to FIG. 6a. The two creatine and water reference maps agree with each other in FIGS. 6b' to 6d', while FIGS. 6b to 6d show clearly different patterns. This clearly demonstrates that the adiabatic $2\pi$-pulse pair achieves uniform refocusing over the selected chemical shift range, whereas conventional refocusing does not.

In vivo studies of healthy brain tissue in two subjects (FIGS. 7b and 7c) show a high degree of agreement with the in vitro measurements (FIG. 7a). The spectrum within the tumour region (FIG. 7d) shows a clearly different pattern than the normal tissue of the same subject (FIG. 6c). Furthermore, it is noteworthy that only k-space regridding and the Fourier transformation were performed during pre- and post-processing of the datasets, and no water removal and baseline correction was used. However, there are still various possibilities to improve the results by post-processing, such as $B_0$ and eddy current correction (EEC). The measurement time of the displayed datasets were about 8 minutes and were performed without parallel imaging techniques, which means a yet shorter total scan time could be achieved by additionally using the GRAPPA or SENSE technique.

The ultra-high magnetic field and slab-only volume selection whole-brain EPSI allow the use of non-selective small BW adiabatic chemical-shift-selective $2\pi$-refocusing pulse pairs. It offers a way to tackle the $B_1^+$-inhomogeneity problem, SAR-limitation and the CSDA at ultra-high magnetic field strength. Additionally, the proposed pulse sequence has excellent water (fat) suppression and intrinsic adiabatic spectral editing property, which replace the conventional non-adiabatic AM Gaussian editing pulses. The in vitro and in vivo studies have shown the sequence's capabilities for clinical application. This will be shown next in Case Study II.

Case Study II

Case study II relates to whole brain spectral editing based on EPSI-based MRSI technique using chemical-shift-selective adiabatic $2\pi$-refocusing pulse pairs applied to 2HG and GABA+ editing.

The SLOW editing method may be implemented with only 2 RF pulses: apart from a slab-selective RF excitation pulse, only one chemical-shift selective adiabatic $2\pi$-refocusing pulse pair with varying passbands. The general properties of a single-shot EPSI sequence using a $2\pi$-refocusing pulse pair are described above. This case study focuses on the editing properties of variable bandwidth $2\pi$-refocusing pulse pairs.

FIGS. 8a and 8b show the adapted EPSI pulse sequence, in which the original slice-selective refocusing pulse was replaced with two different adiabatic complex secant hyperbolic RF pulse pairs $B_1^+(t)=\Omega_0 \cdot \text{sech}(\beta t)^{1+i\mu}$ selectively refocusing two different chemical-shift frequency ranges mimicking editing "off" and "on" of MEGA-typed editing. In SLOW editing, "editing-off" is referred to as "editing-full" and "editing-on" as "editing-partial". In vitro tests were carried out on three spherical phantoms (1.) brain metabolite phantom (GE), (2.) home-built 2hydroxyglutarate (2HG)-phantom (~7.8 mmol/L of 2HG and 18 mmol/L of glycine), and (3.) home-bulk GABA-phantom (~10 mmol/L of GABA, creatine, and glycine). In vivo test was performed on one healthy volunteer. All measurements were performed on a 7 T MAGNETOM Terra MR scanner in clinical mode. FIGS. 8a and 8b show the SLOW-EPSI spectral editing sequence scheme, where FIG. 8a illustrates chemical-shift-selective refocusing of the full range of the targeted J-coupled spin system of interest, and where FIG. 8b illustrates chemical-shift-selective refocusing of the partial range of the targeted spin system of interest.

In FIG. 9a, the frequency-selective refocusing chemical-shift frequency ranges are displayed for the 2HG-edited SLOW-EPSI whole brain MRSI. During the first acquisition the whole spectrum from 1.8 ppm to 4.2 ppm is refocused (denoted by editing-full), whereas the second echo is obtained by refocusing the range of 0.8 ppm to 3.2 ppm (denoted by editing-partial). Like in MEGA editing, SLOW editing also requires the two responses to be subtracted for most metabolites except for Glc which is a single-shot application.

As a second example of SLOW editing, GABA editing can be similarly performed by selectively refocusing the range of 1.65 ppm to 4.2 ppm during editing "full" and the range of 2.7 ppm to 4.2 ppm during editing "partial" phase.

FIG. 9a shows the simulation of the adiabatic pulses (used as inversion pulses in the simulation for simplicity). The passband and the transition band are indicated by grey and light grey, respectively, for editing-full and editing-partial pulses (also referred as SLOW-full and SLOW-partial pulses). FIG. 9b shows the editing full/partial pulse having a bandwidth of 840 Hz but with a different carrier frequency, TR=1500 ms, volume of interest (VOI)=280×220×100 mm, voxel size=4.3×11×13.8 mm, and total measurement time=6 min. FIGS. 9b to 9d show the in vitro result of SLOW editing for different echo times. As expected, the editing effect shows a clear TE-dependence, indicating that the TE=120 ms may be the optimal TE for 2HG-detection at 7 T.

FIGS. 10a and 10b show the effect of the SLOW-EPSI pulse sequence applied to a phantom containing all the main brain metabolites (NAA, Glu, Cr, Cho, etc.), however except for GABA. The SLOW-full refocuses the chemical-shift frequency range of 1.6 ppm to 4.2 ppm, whereas the SLOW-partial refocuses the range of 2.7 ppm to 4.2 ppm. The difference spectrum in FIG. 10b very nicely shows the co-editing effect on glutamate (Glu) multiplet resonating at approximately 3.75 ppm. In FIG. 10a, the editing-full pulse (solid line) had a BW of 880 Hz with carrier frequency at 3.15 ppm, while the editing-partial pulse (dashed line) had a BW of 560 Hz with a carrier frequency at 2.6 ppm. FIG.

10b shows the difference of the editing-full and editing-partial spectral responses. The grey area indicates the effective spectral editing region, TR=1500 ms, VOI=280×220× 100 mm, voxel size=4.3×11×13.8 mm, and total measurement time=6 min.

FIGS. 11a to 11f' show the effect of SLOW editing on a GABA-, glycine-, and creatine-containing phantom, GABA phantom 1-slice measurement, TR=1500 ms, VOI=280× 220×15 mm, voxel size=4.3×11×15 mm, and total measurement time=1 min. FIGS. 12a to 12b' show the in vivo results of the SLOW-EPSI editing sequence for two patients. FIGS. 12a and 12b show the editing-difference spectrum (editing-partial minus editing-full) and corresponding MRI of IDH-mutated and IDH-wildtype patients, respectively. The 2HG peak in FIG. 12a is the biomarker for IDH-mutated gliomas. FIGS. 12a' and 12b' show the corresponding MRI and selected volume (the size is indicated at the bottom left), TE=68 ms, TR=1500 ms, VOI=280×220×100 mm, voxel size=4.3×7.8×7.8 mm, and total measurement time=9:04 min.

SLOW editing has been presented which is an alternative method to spectral editing using MEGA editing based on adiabatic 2π-refocusing pulse pairs and was integrated in a 3D-spatial resolved EPSI pulse sequence and tested at 7 T. Since this pulse sequence requires only one slab-selective excitation pulse and an adiabatic chemical-shift-selective 2π-refocusing pulse pair having variable passbands for each editing dataset (SLOW-full and SLOW-partial), the SAR can be kept extremely low. In contrast to MEGA editing integrated into semiLASER, SLOW editing uses adiabatic refocusing and is therefore robust towards $B_1^+$-inhomogeneities which are inherent at UHF MRI/MRS. Finally, due to the use of the narrow band chemical-shift-selective adiabatic 2π-refocusing pulse pairs there is no in-plane CSDA, and a minimal CSDA perpendicular due to a non-adiabatic slab-selective excitation pulse.

Case Study III

FIG. 13 shows one GABA map out of nine maps covering the whole brain, obtained using the proposed novel editing method of the invention, at a field strength of 7 T, TE=68 ms, and TR=1500 ms. The original acquisition matrix was 65×26×9 and field of view (FOV)=280 mm×180 mm×60 mm (resolution=4.3 mm×6.9 mm×6.7 mm). The number of averages was 1. The total measurement time was 10.0 minutes to obtain the edited spectra. The measurement was performed on a healthy male volunteer. FIG. 13 also shows the sum spectrum over all the voxels of the GABA map, indicating the chemical-shift interval over which the simple peak integration was performed. Due to the very high quality of the spectra over the brain plain even simple signal integration can used for quantifying metabolite content for generation of metabolite maps. Neither spectral baseline correction, nor water removal was applied, illustrating the implicit superior additional (implicit) water/lipid suppression of the applied chemical-shift-selective 2π-pulse pairs. It should be noted that this additional/implicit water/lipid suppression is obtained at zero additional SAR to be applied to the patient. More specifically, the bandwidth of the chemical-shift selective adiabatic 2π-refocusing pulse pairs excludes the frequency range of one or more untargeted resonances, for example water, lipid and/or one or more other untargeted resonances. Therefore, the aliasing artefact due to limited acquisition spectral bandwidth when combined with fast MRSI techniques at UHF is massively reduced.

FIG. 14 shows one Glx metabolic image of a 3D SLOW-EPSI dataset covering the whole brain, obtained using the proposed novel editing method of the invention, at a field strength of 7 T, TE=68 ms, and TR=1500 ms. The original acquisition matrix was 65×26×9 and FOV=280 mm×180 mm×60 mm (resolution=4.3 mm×6.9 mm×6.7 mm). The number of averages was 1. The total measurement time was 10.0 minutes to obtain the edited spectra. The measurement was performed on a healthy male volunteer. FIG. 14 also shows the sum spectrum over al voxels of the Gix map, indicating the chemical shift interval over which the integral was computed. The high quality of the spectra over the brain was such that it even allows for plain signal integration. Neither spectral baseline correction, nor water rwas applied, illustrating the implicit superior additional water suppression of the chemical-shift-selective 2π-pulse pairs.

Case Study IV

Case study IV concerns a single-shot SLOW editing with an asymmetric adiabatic 2π-pulse pair to detect α-glucose. Glucose exists in a watery solution as an equilibrium mix of α-glucose and β-glucose. Starting from pure crystalline α-glucose dissolved in water, it takes at room temperature approximately 100-150 minutes to reach the equilibrium mixture of 33% α-glucose and 67% β-glucose. The effect is well known in vitro, but we could also prove the effect to be present in vivo in the brain, even after the α-glucose passes the blood brain barrier. Since α-glucose has an isolated multiplet resonance at 5.22 ppm which β-glucose does not have, an enhancing effect on the α-glucose may be expected in vivo even if the equilibrium concentration of glucose does not change in the tissue (our in vivo data support this effect). In other words, freshly prepared α-glucose solution can be used as a tracer like deuterated glucose, and this effect can be detected by single-shot SLOW editing. The cost of α-glucose is however a factor 1000 cheaper than deuterated glucose.

FIG. 15 illustrates the single-shot SLOW-EPSI spectral editing sequence scheme. Only partial coverage is required if there is no overlap between other metabolites and the targeted metabolite. Since in this example only 5.22 ppm resonance is within the passband, the J-coupling is nicely refocused by the SLOW-partial procedure.

FIGS. 16a to 16c show the evolution from pure alpha-glucose to alpha-beta equilibrium glucose in vitro by single-shot SLOW-EPSI. FIG. 16a illustrates the pulse profile of editing-partial pulse, FIG. 16b illustrates the spectrum of the phantom measurements at two different time instants after dissolving α-glucose powder (11 minutes and 360 minutes), and FIG. 16c illustrates a plot of peak integration of the α-glucose with 5.22 ppm resonance as a function of time after dissolution of α-glucose powder (TE=120 ms, TR=1500 ms, matrix=65×23×7, FOV=280×100×70 mm, displaced volume=2.15×2.15×1 cm, averages=1, and TA=20:18 min).

FIGS. 17a to 17d show the asymmetric version of single-shot SLOW-EPSI, and the in vivo measurement with glucose uptake. Ingestion of pure α-glucose increases SNR by approximately 2 and 1.3 compared to no ingestion and ingestion of the same amount of alpha-beta-glucose at equilibrium. FIG. 17a shows the pulse sequence with asymmetric adiabatic pulses. FIG. 17b shows the pulse profile of the editing-partial pulse. FIG. 17c shows the spectra before and after uptake of alpha-beta equilibrium glucose. FIG. 17d shows the spectra before and after uptake of pure alpha-glucose. In the measurements TE=60 ms, TR=1500 ms, matrix=65×23×7, FOV=280×100×70 mm, displaced volume=2.15×2.15×1 cm, averages=6, and TA=20:18 min.

While the invention has been illustrated and described in detail in the drawings and foregoing description, such illustration and description are to be considered illustrative or exemplary and not restrictive, the invention being not limited to the disclosed embodiments. Other embodiments and variants are understood and can be achieved by those skilled in the art when carrying out the claimed invention, based on a study of the drawings, the disclosure, and the appended claims. New embodiments may be obtained by combining any of the techniques above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. Method of selectively measuring a predetermined substance in a magnetic resonance analysis of a predetermined volume of a subject material, the method comprising:
   a first cycle of excitation, editing, refocusing, and acquisition of a first MRS response signal having a first spectral range, wherein the editing and refocusing are both performed using a first phase-compensated, chemical-shift-selective adiabatic $2\pi$-refocusing pulse pair with mutually time-shifted pulses.

2. Method of selectively measuring a predetermined substance in a magnetic resonance analysis of a predetermined volume of a subject material, the method comprising:
   a first cycle of excitation, refocusing and acquisition of a first MRS response signal having a first spectral range, wherein the refocusing is performed using a first phase-compensated, chemical-shift-selective adiabatic $2\pi$-refocusing pulse pair with mutually time-shifted pulses without applying a gradient magnetic field to the predetermined volume of the subject material.

3. Method according to claim 1, wherein the refocusing is performed without spatial-selective refocusing.

4. Method according to claim 1, wherein the subject material is the tissue of a human brain, and the predetermined substance is a spin system of (a) metabolite(s) of the brain tissue.

5. Method according to claim 1, wherein the editing and refocusing operations involve using only one phase-compensated, chemical-shift-selective adiabatic $2\pi$-refocusing pulse pair with mutually time-shifted pulses.

6. Method according to claim 1, comprising a second cycle of excitation, editing, refocusing and acquisition of a second MRS response signal having a second spectral range, different from the first spectral range, wherein the editing and refocusing are performed using a second phase-compensated, chemical-shift-selective adiabatic $2\pi$-refocusing pulse pair, and performing a mathematical comparison of the first and second response signals.

7. Method according to claim 1, wherein the said acquisition is performed using an echo-planar spectroscopic imaging method.

8. Method according to claim 1, wherein the excitation comprises a proton excitation.

9. Method according to claim 1, wherein the excitation comprises a nucleus other than protons, or is part of a heteronuclear excitation pulse sequence.

10. Method according to claim 1, wherein the pulses are complex-valued secant hyperbolic radio frequency pulses.

11. Method according to claim 1, wherein the bandwidth of the pulses excludes the chemical-shift frequency range of one or more untargeted resonances.

12. Method according to claim 1, wherein the method further comprises alpha-glucose and/or beta-glucose intake and/or infusion by a patient under examination.

13. Magnetic resonance scanning apparatus for carrying out the method of claim 1, the apparatus comprising:
    excitation means for imparting an excitation pulse to the subject material;
    refocusing means configured to impart refocusing pulses to the subject material;
    acquisition means configured to acquire MRS response signals from the subject material;
    editing means configured to generate the refocusing pulses as a phase-compensated, chemical-shift-selective adiabatic $2\pi$-refocusing pulse pair with mutually time-shifted pulses.

14. A non-transitory computer-readable medium with stored instructions for, upon execution by one or more processors of a magnetic resonance scanning apparatus causing the apparatus to perform the method of claim 1.

15. Method according to claim 4, wherein the method is performed in vivo, and the volume is substantially all, or at least a majority of, the tissue of the brain or other organ.

16. Method according to claim 4, wherein the metabolite comprises one or more of the following: 2HG, GABA, PE, Glu/Gln, and Glc.

17. Method according to claim 5, wherein the first spectral range comprises a partial chemical-shift selection frequency range of the radio frequency response range of the predetermined substance.

18. Method according to claim 6, wherein the first spectral range comprises substantially the full chemical-shift frequency range of the radio frequency response range of the predetermined substance, and the second spectral range comprises one or more predetermined sub-ranges of the said full frequency range.

19. Method according to claim 6, wherein the editing and refocusing operations of the first and second cycles involve using in total only two phase-compensated, chemical-shift-selective adiabatic $2\pi$-refocusing pulse pairs with mutually time-shifted pulses.

20. Method according to claim 6, wherein the mathematical comparison comprises subtracting one of the first and second response signals from the other of the first and second response signals.

* * * * *